US012489238B2

(12) United States Patent
Okamoto et al.

(10) Patent No.: US 12,489,238 B2
(45) Date of Patent: Dec. 2, 2025

(54) ELECTRICAL CONNECTOR IN WHICH TIP SECTIONS OF CONTACTS ARE IN CONTACT WITH PROTRUSION SECTIONS OF A HOUSING, AND METHOD FOR MANUFACTURING THE SAME

(71) Applicants: Tsubasa Okamoto, Tokyo (JP); Takaki Tsutsui, Tokyo (JP)

(72) Inventors: Tsubasa Okamoto, Tokyo (JP); Takaki Tsutsui, Tokyo (JP)

(73) Assignee: MITSUMI ELECTRIC CO., LTD., Tama (JP)

( * ) Notice: Subject to any disclaimer, the term of this patent is extended or adjusted under 35 U.S.C. 154(b) by 328 days.

(21) Appl. No.: 18/199,904

(22) Filed: May 19, 2023

(65) Prior Publication Data

US 2023/0387621 A1 Nov. 30, 2023

(30) Foreign Application Priority Data

May 30, 2022 (JP) ................................ 2022-087789

(51) Int. Cl.
*H01R 13/405* (2006.01)
*H01R 13/504* (2006.01)
*H01R 43/18* (2006.01)

(52) U.S. Cl.
CPC ......... *H01R 13/405* (2013.01); *H01R 13/504* (2013.01); *H01R 43/18* (2013.01)

(58) Field of Classification Search
None
See application file for complete search history.

(56) References Cited

U.S. PATENT DOCUMENTS 7,445,505 B1 * 11/2008 Yi ...................... H01R 13/6485 439/181
7,806,735 B1 * 10/2010 Chen .................... H01R 13/658 439/79
2017/0040748 A1 * 2/2017 Tsai ...................... H01R 13/405
2017/0162975 A1 * 6/2017 Tsai ........................ H01R 24/60
2018/0175555 A1 * 6/2018 Zhao .................... H01R 13/405

FOREIGN PATENT DOCUMENTS

JP 2020-071954 5/2020

* cited by examiner

*Primary Examiner* — Oscar C Jimenez
(74) *Attorney, Agent, or Firm* — LEX IP MEISTER, PLLC

(57) ABSTRACT

An electrical connector includes an insulating housing, which is equipped with a base section, a tongue-shaped section, multiple accommodation concave sections formed on the tongue-shaped section, and multiple protrusion sections extending from tip surfaces of the multiple accommodation sections toward a base end side, and multiple contacts, which are held on the tongue-shaped section of the housing so as to be arranged on a contact plane and extend linearly along an insertion/removal direction of a mating connector. Respective tip sections of the multiple contacts are located within the multiple accommodation concave sections, and the multiple protrusion sections are in contact with the tip sections of the multiple contacts. The multiple contacts are not bonded to the tongue-shaped section of the housing.

14 Claims, 15 Drawing Sheets

ELECTRICAL CONNECTOR IN WHICH TIP SECTIONS OF CONTACTS ARE IN CONTACT WITH PROTRUSION SECTIONS OF A HOUSING, AND METHOD FOR MANUFACTURING THE SAME

INCORPORATION BY REFERENCE

This application is based upon, and claims the benefit of priority from, corresponding Japanese Patent Application No. 2022-087789 filed in the Japan Patent Office on May 30, 2022, the entire contents of which are incorporated herein by reference.

BACKGROUND OF THE INVENTION

Technical Field

The present invention generally relates to an electrical connector and a method for manufacturing an electrical connector, and, more specifically, relates to an electrical connector and a method for manufacturing an electrical connector in which, in a state where multiple contacts are held on a tongue-shaped section of a housing so that tip sections of the multiple contacts are located within multiple accommodation concave sections formed on the tongue-shaped section of the housing, multiple protrusion sections extending from tip surfaces of the multiple accommodation concave sections formed on the tongue-shaped section of the housing are respectively brought into contact with the tip sections of the multiple contacts, so that the integrity of the tongue-shaped section of the housing and the multiple contacts is enhanced, and, accordingly, buckling and deformation of the multiple contacts installed on the tongue-shaped section of the housing can be prevented.

Background Art

Conventionally, electrical connectors have been used to electrically connect an electronic device to another electronic device. To obtain an electrical connection between an electronic device and another electronic device, two types of electrical connectors are used in combination, i.e., a receptacle connector, which is mounted on a circuit board installed in the casing of an electronic device and whose insertion port is exposed to the outside of the electronic device via a through-hole installed in the casing of the electronic device, and a plug connector, which is inserted into the insertion port of the receptacle connector.

Further, downsizing of electronic devices in recent years has increased the demand for downsizing electrical connectors. In response to such a demand for downsizing electrical connectors, the USB Type-C standard has been proposed (see Japanese Unexamined Patent Application Publication No. 2020-71954). Electrical connectors that comply with the USB Type-C standard employ a vertically symmetrical design, which allows plug connectors to be inserted into receptacle connectors regardless of the connector's vertical orientation.

Electrical connectors that comply with the USB Type-C standard include a metal shell and an inner structure that is accommodated inside the shell. For example, Japanese Unexamined Patent Application Publication No. 2020-71954 discloses an electrical connector that includes the inner structure 500 as illustrated in FIG. 1. As illustrated in FIG. 1, the inner structure 500 includes the multiple contacts 501 that respectively make contact with multiple connectors of a mating connector (plug connector), the ground plate 502, and the insulating housing 503 that holds the multiple contacts 501 and the ground plate 502 in the state of being insulated with each other.

The housing 503 includes the base section 504, the tongue-shaped section 505 extending from the base section 504 toward the tip side, and the multiple contact receiving sections 506 formed on the tongue-shaped section 505. The tongue-shaped section 505 of the housing 503 is a flat plate member which extends from the base section 504 toward the tip side and on which the multiple contacts 501 are placed, and, furthermore, the ground plate 502 is held therein. Furthermore, the multiple contacts 501 are respectively accommodated within the multiple contact receiving sections 506 formed on the tongue-shaped section 505.

As illustrated in FIG. 1, the multiple contacts 501 are arranged so as to be parallel to each other in the same plane along one direction (the insertion/removal direction of mating connectors) and are placed respectively within the multiple contact receiving sections 506 formed on the tongue-shaped section 505. The multiple contacts 501 respectively include the tip sections 507, the contact point sections 508 exposed outward on the tongue-shaped section 505 of the housing 503, and the horizontal extension sections 509 that extend horizontally from the contact point sections 508 to the base end side and are embedded within the base sections 504 of the housing 503. The respective contact point sections 508 of the multiple contacts 501 make contact with the corresponding contacts of a mating connector when the mating connector is inserted into the electrical connector including the inner structure 500. Here, the mating connector and the electrical connector turn into an engaged state, so that an electrical connection is provided between the mating connector and the electrical connector.

The horizontal extension sections 509 of the contacts 501 extend in the same direction as the extension direction of the contact point sections 508. The horizontal extension sections 509 are embedded within the base section 504 of the housing 503, and the horizontal extension sections 509 of the contacts 501 are fixed to the housing 503. On the other hand, the tip sections 507 and the contact point sections 508 of the contacts 501 are accommodated within the contact receiving sections 506 of the housing 503 but are not bonded or the like to the tongue-shaped section 505 and not fixed to the tongue-shaped section 505.

Thus, the tip sections 507 and the contact point sections 508 of the contacts 501 are not fixed to the tongue-shaped section 505 of the housing 503. Therefore, when a mating connector is inserted into an electrical connector, in a case where the insertion angle of the mating connector with respect to the electrical connector is oblique, the corresponding contacts of the mating connector make contact with the contact point sections 508 of the contacts 501 at an angle, which thereby causes a load to be applied to the contact point sections 508. The applied load may cause buckling or deformation of the contact point sections 508 and result in detachment (flip up) of the contact point sections 508 from the tongue-shaped section 505. As a result, there are such problems that the reliability of the connection between the contacts 501 and the corresponding contacts of the mating connector is compromised and that the product life of the electrical connector is shortened.

To deal with such problems, a method is known in which the housing 503 and all of the contacts 501 are integrated by simultaneously performing integral molding (insert molding) so as to bond (fix) the tip sections 507 and the contact point sections 508 of all of the contacts 501 to the tongue-shaped section 505 of the housing 503. According to this method, even if the mating connector is inserted to the electrical connector at an angle, the contact point sections 508 of all of the contacts 501 are bonded and fixed to the tongue-shaped section 505, and thus it is possible to prevent the contact point sections 508 from buckling or deforming and detaching from the tongue-shaped section 505. However, regarding such integral molding which integrates all of the contacts 501 and the housing 503 simultaneously, since a number of parts including all of the contacts 501 are integrally molded simultaneously, the difficulty of positioning each part is increased, and the technical difficulty of the integral molding is increased. Furthermore, since it is necessary to perform integral molding for a large number of parts, the structure of the mold for the integral molding is complex, which increases the cost of the mold and the manufacturing cost of the electrical connectors.

SUMMARY OF THE INVENTION

The present invention is made in view of the above-described conventional problems. The object thereof is to provide an electrical connector and a method for manufacturing an electrical connector that can effectively prevent buckling and deformation of a contact held on a tongue-shaped section of a housing of the electrical connector.

Such an object is achieved by the present invention of (1) or (2) below.

(1) An electrical connector that can be engaged with a mating connector inserted from a tip side, and the electrical connector includes: an insulating housing including a base section, a tongue-shaped section extending from the base section in an insertion/removal direction of the mating connector, a plurality of accommodation concave sections formed on the tongue-shaped section, and a plurality of protrusion sections installed on the tongue-shaped section so as to extend from tip surfaces of the plurality of accommodation concave sections toward a base end side; and a plurality of contacts held on the tongue-shaped section of the housing so as to be arranged on a contact plane and extend linearly along the insertion/removal direction of the mating connector, wherein tip sections of the plurality of contacts are respectively located within the plurality of accommodation concave sections formed on the tongue-shaped section of the housing, the plurality of protrusion sections of the housing are in contact with the tip sections of the plurality of contacts located within the plurality of accommodation concave sections, and the plurality of contacts are not bonded to the tongue-shaped section of the housing.

(2) A method for manufacturing an electrical connector, and the method includes: using an insulating housing including a base section, a tongue-shaped section extending from the base section in an insertion/removal direction of a mating connector, a plurality of accommodation concave sections formed on the tongue-shaped section, and a plurality of protrusion sections installed on the tongue-shaped section, so as to hold the plurality of contacts on the tongue-shaped section of the housing so that tip sections of the plurality of contacts are respectively located within the plurality of accommodation concave sections; and heat welding of heating and pressing the plurality of protrusion sections of the housing so that the plurality of protrusion sections of the housing are respectively brought into contact with the tip sections of the corresponding contacts, wherein, after the heat welding, the plurality of protrusion sections of the housing respectively extend from tip surfaces of the plurality of accommodation concave sections toward a base end side and, furthermore, are in contact with the tip sections of the corresponding contacts respectively located within the plurality of accommodation concave sections, and the plurality of contacts are not bonded to the tongue-shaped section of the housing.

In the electrical connector of the present invention, the multiple protrusion sections installed so as to extend from the tip sections of the multiple accommodation concave sections to the base end side are respectively in contact with the tip sections of the multiple contacts, which are respectively located within the multiple accommodation concave sections formed on the tongue-shaped section of the housing. Therefore, the integrity of the tongue-shaped section of the housing and the contacts is enhanced. As a result, it is possible to prevent buckling or deformation of the contacts installed on the tongue-shaped section of the housing, which can occur when a mating connector is inserted into the electrical connector. Therefore, the reliability of the connection between the electrical connector and the contacts of mating connectors can be improved, and, furthermore, the product life of the electrical connector can be extended.

Furthermore, according to the method for manufacturing the electrical connector of the present invention, unlike the conventional technology, it is not necessary to execute integral molding for simultaneously integrating a number of parts including the multiple contacts in order to prevent buckling or deformation of the contacts installed on the tongue-shaped section of the housing. Therefore, electrical connectors can be easily manufactured without the need to execute such a technically difficult integral molding for simultaneously integrating a number of parts as in the conventional technology. Furthermore, the manufacturing cost of electrical connectors can be reduced because expensive molds with complex structures for simultaneously integrating a number of parts are no longer necessary.

DETAILED DESCRIPTION

Figure 1:
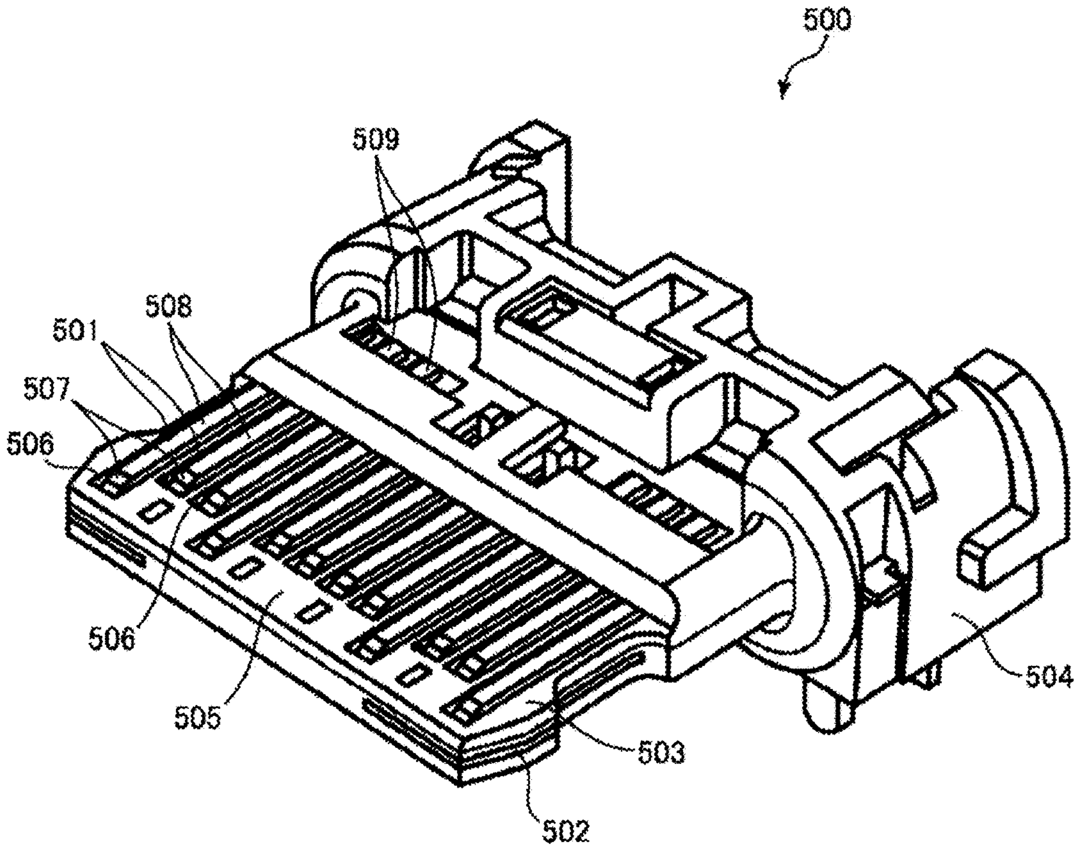
FIG. 1 (PRIOR ART)
FIG. 1 is a perspective view of a conventional electrical connector.

Hereinafter, an explanation is given of the electrical connector and the method for manufacturing the electrical connector of the present invention, based on the preferable embodiment illustrated in the accompanying drawings. Note that each of the drawings to be referred to below is a schematic diagram prepared for the explanation of the present invention. The dimensions (length, width, thickness, etc.) of each of the constituent elements illustrated in the drawings do not necessarily reflect the actual dimensions. Further, in each of the drawings, the same or corresponding elements are assigned with the same reference numerals. In the following explanation, the positive direction of the Z axis in each of the drawings is referred to as the "tip side", the negative direction of the Z axis is referred to as the "base end side", the positive direction of the Y axis is referred to as the "upper side", the negative direction of the Y axis is referred to as the "lower side", the positive direction of the X axis is referred to as the "near side", and the negative direction of the X axis is referred to as the "far side". Further, the Z direction may be referred to as the "insertion/removal direction of mating connectors".

Figure 2:
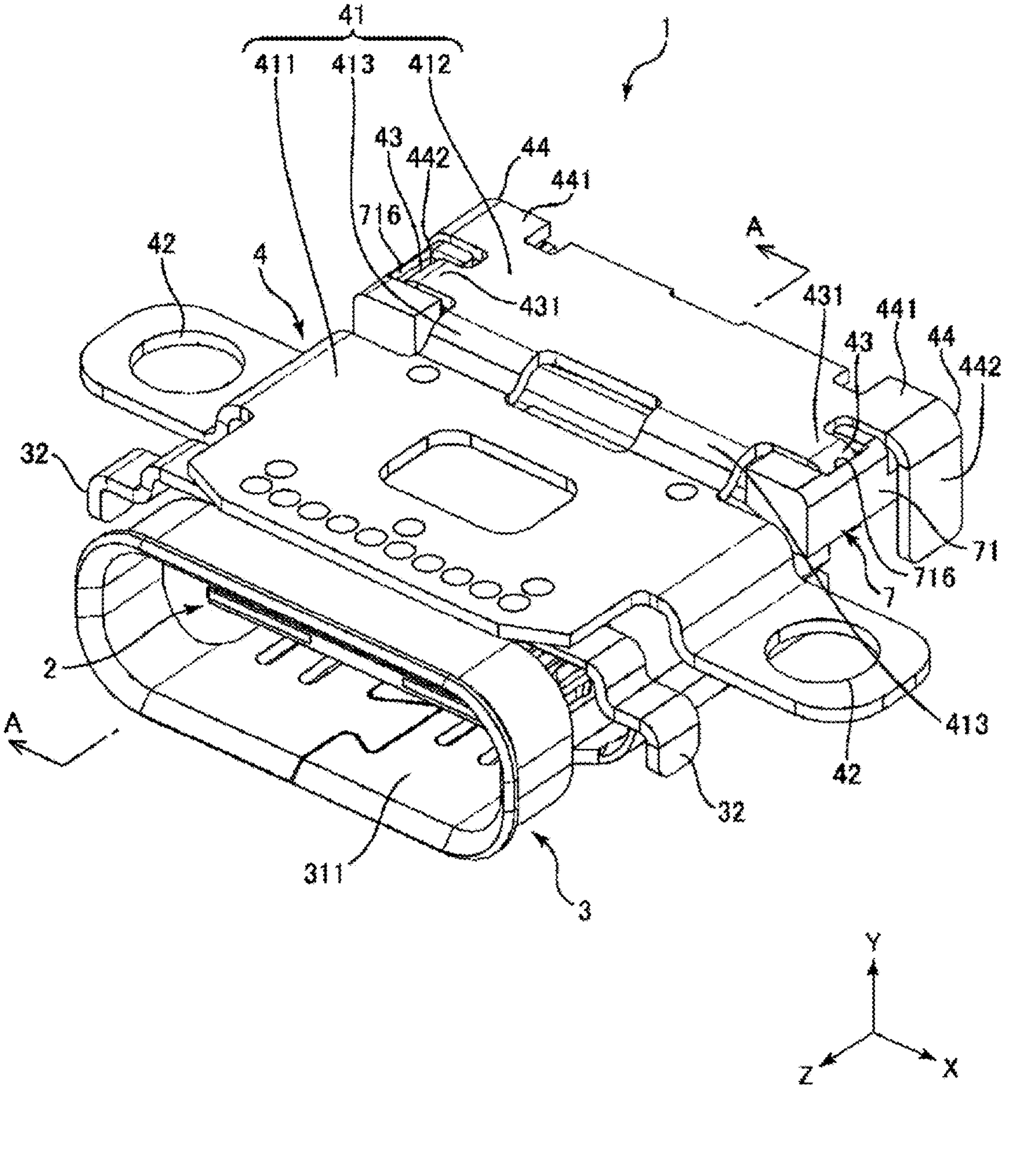
FIG. 2 is a perspective view of an electrical connector according to an embodiment of the present invention.
Figure 3:
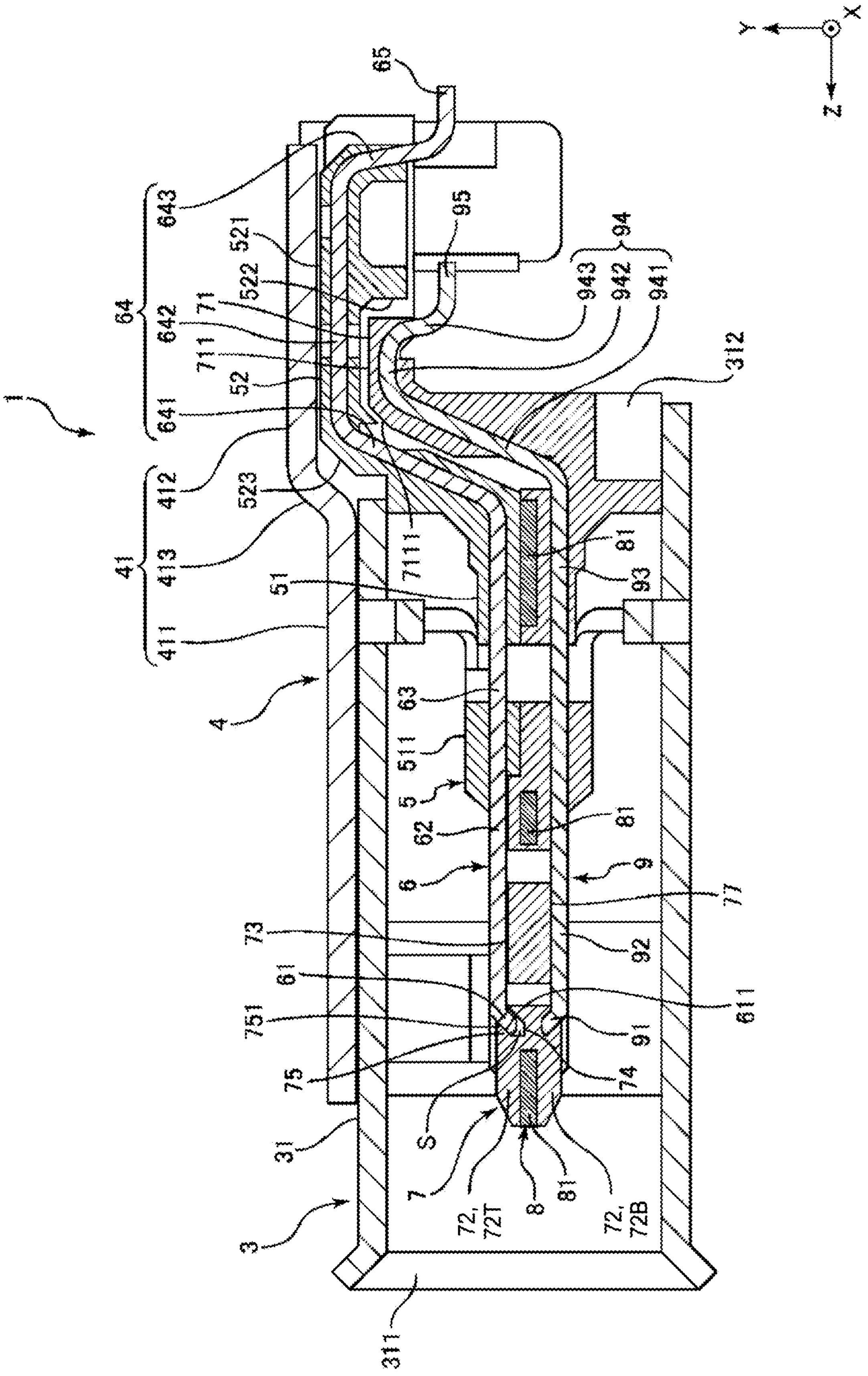
FIG. 3 is a cross-sectional view of the A-A line of the electrical connector illustrated in FIG. 2.
Figure 4:
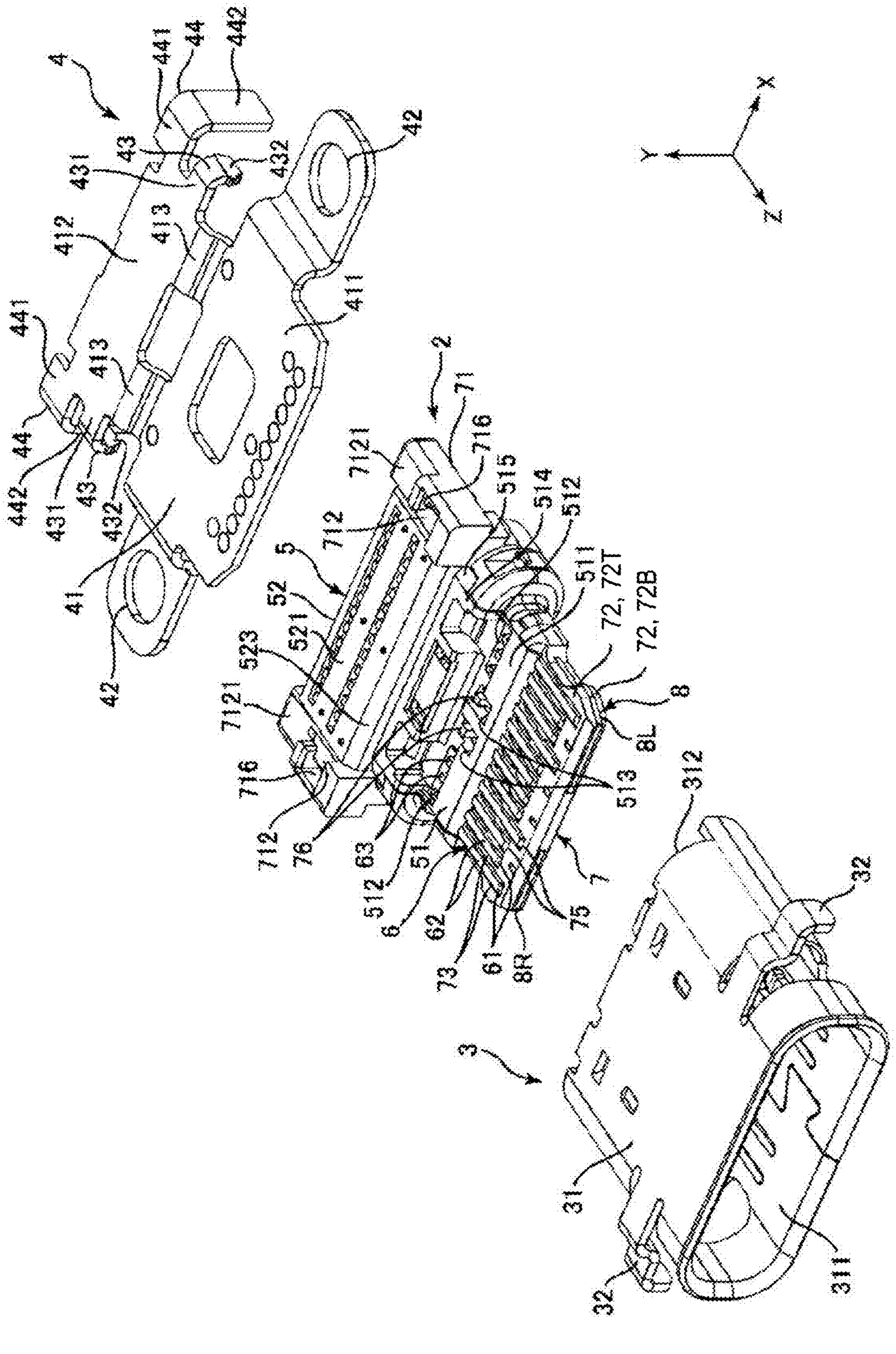
FIG. 4 is an exploded perspective view of the electrical connector according to the embodiment of the present invention.
Figure 5:
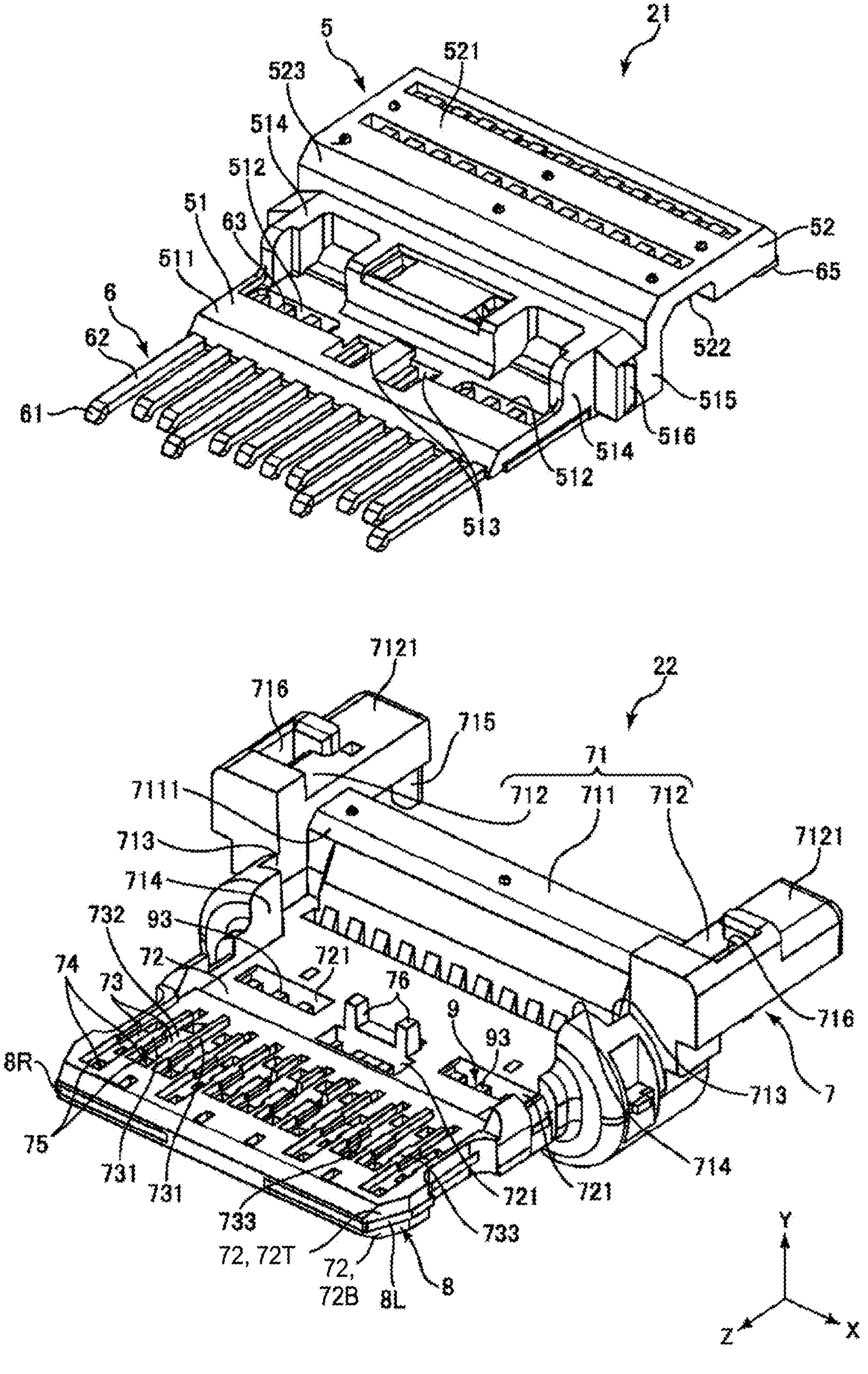
FIG. 5 is a perspective view of an exploded upper part and lower part of the inner structure illustrated in FIG. 4.
Figure 6:
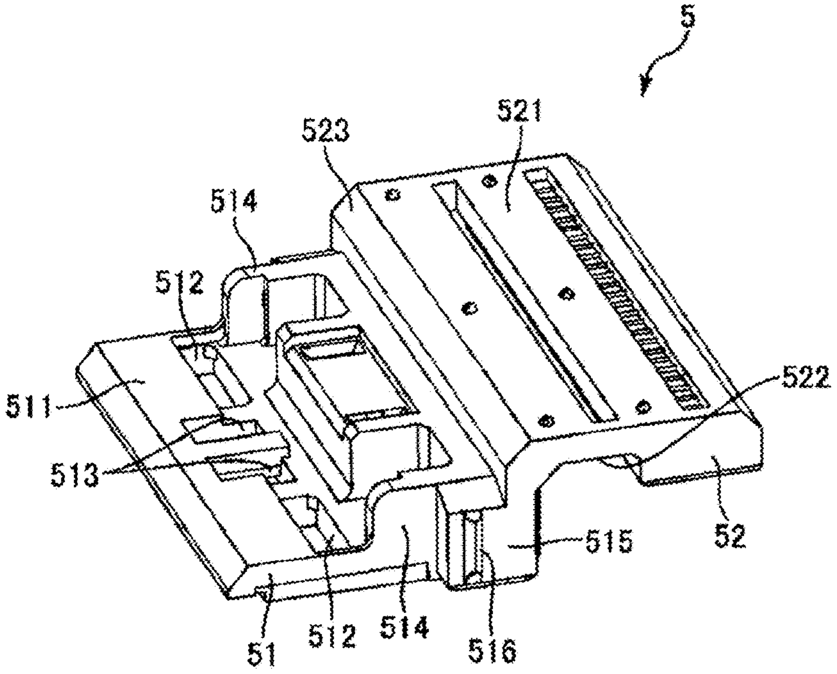
FIG. 6 is an exploded perspective view of the upper part illustrated in FIG. 5.
Figure 6:
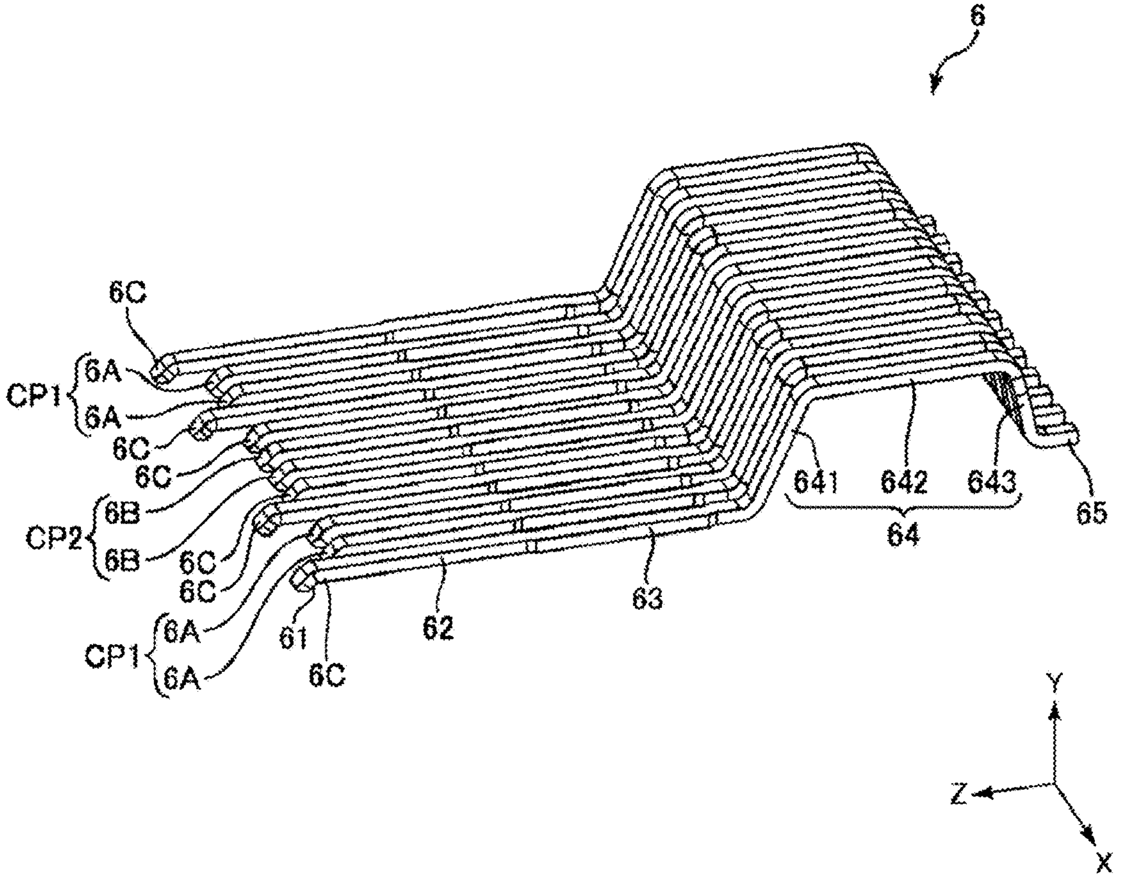
Figure 7:
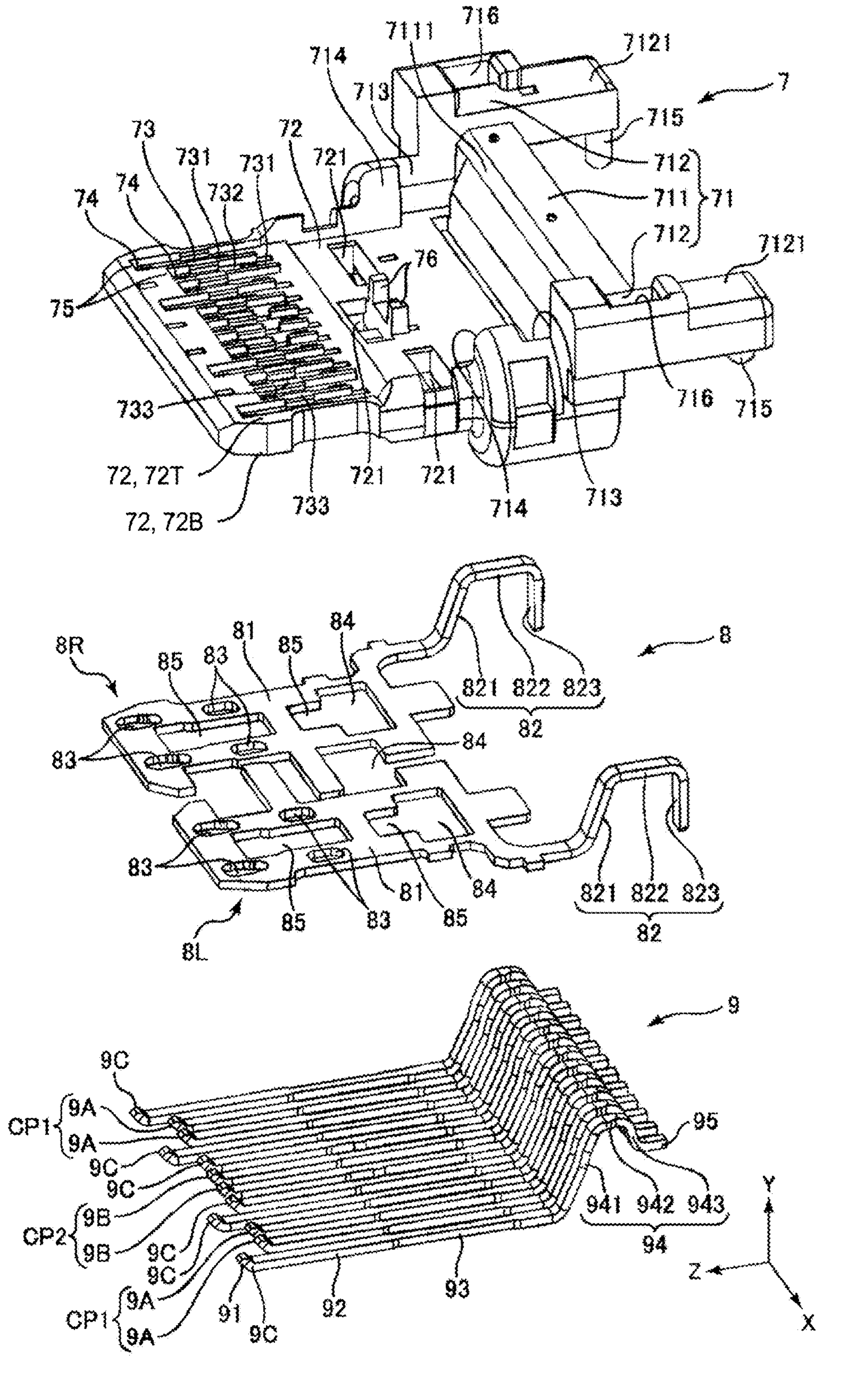
FIG. 7 is an exploded perspective view of the lower part illustrated in FIG. 5.
Figure 8:
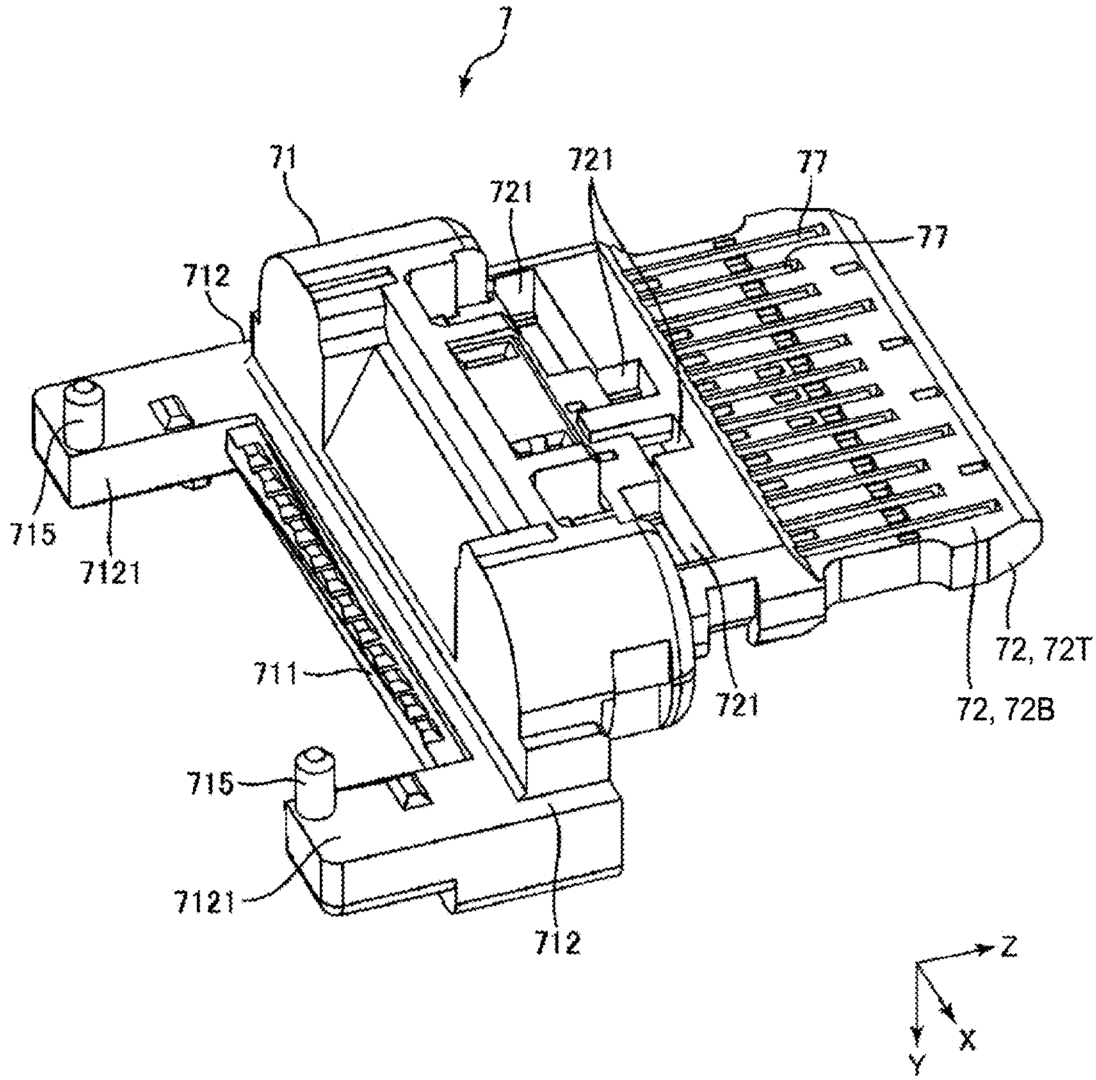
FIG. 8 is a perspective view illustrating the lower housing illustrated in FIG. 7 from another angle.
Figure 9:
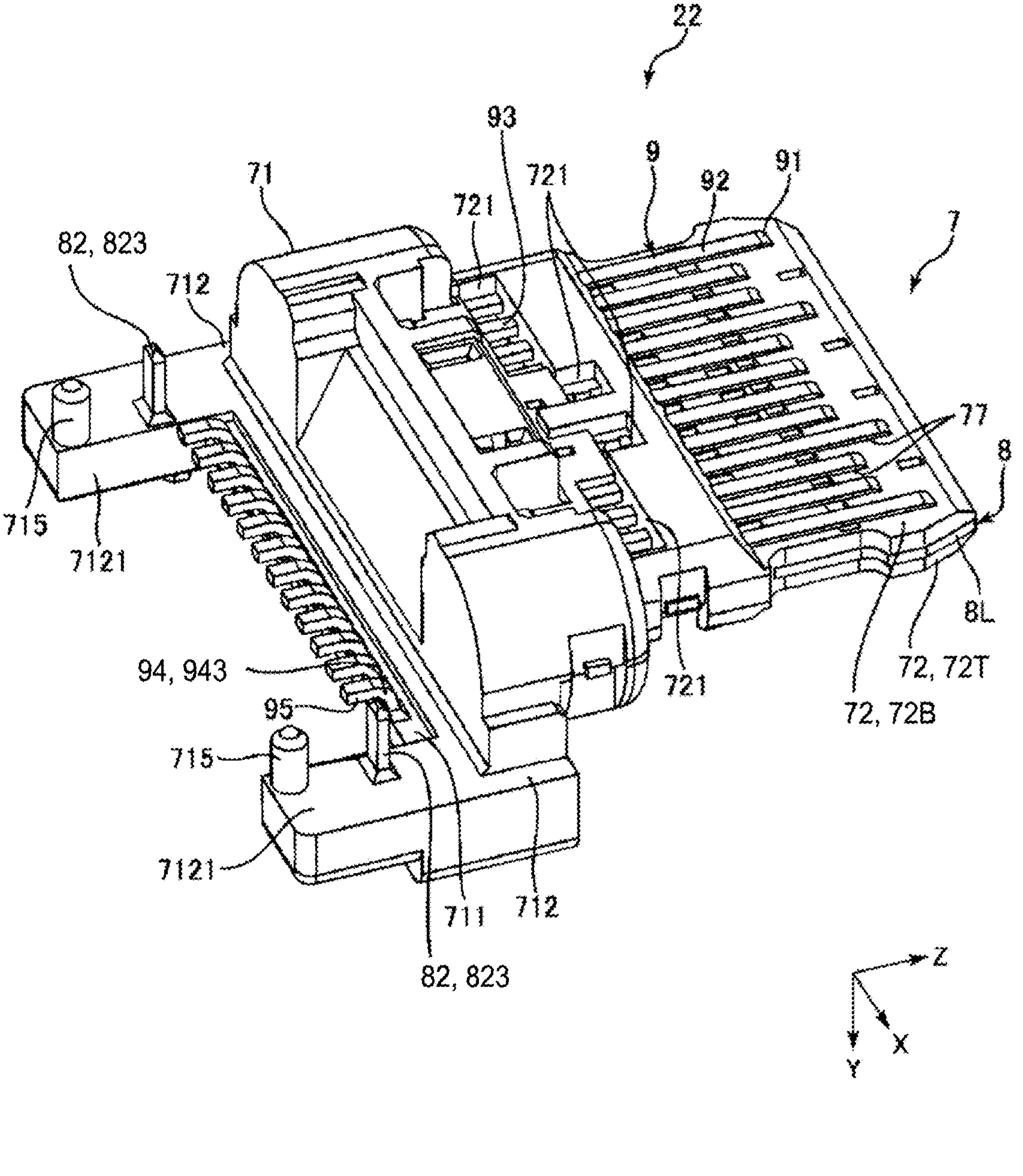
FIG. 9 is a perspective view illustrating the lower part illustrated in FIG. 5 from another angle.
Figure 10:
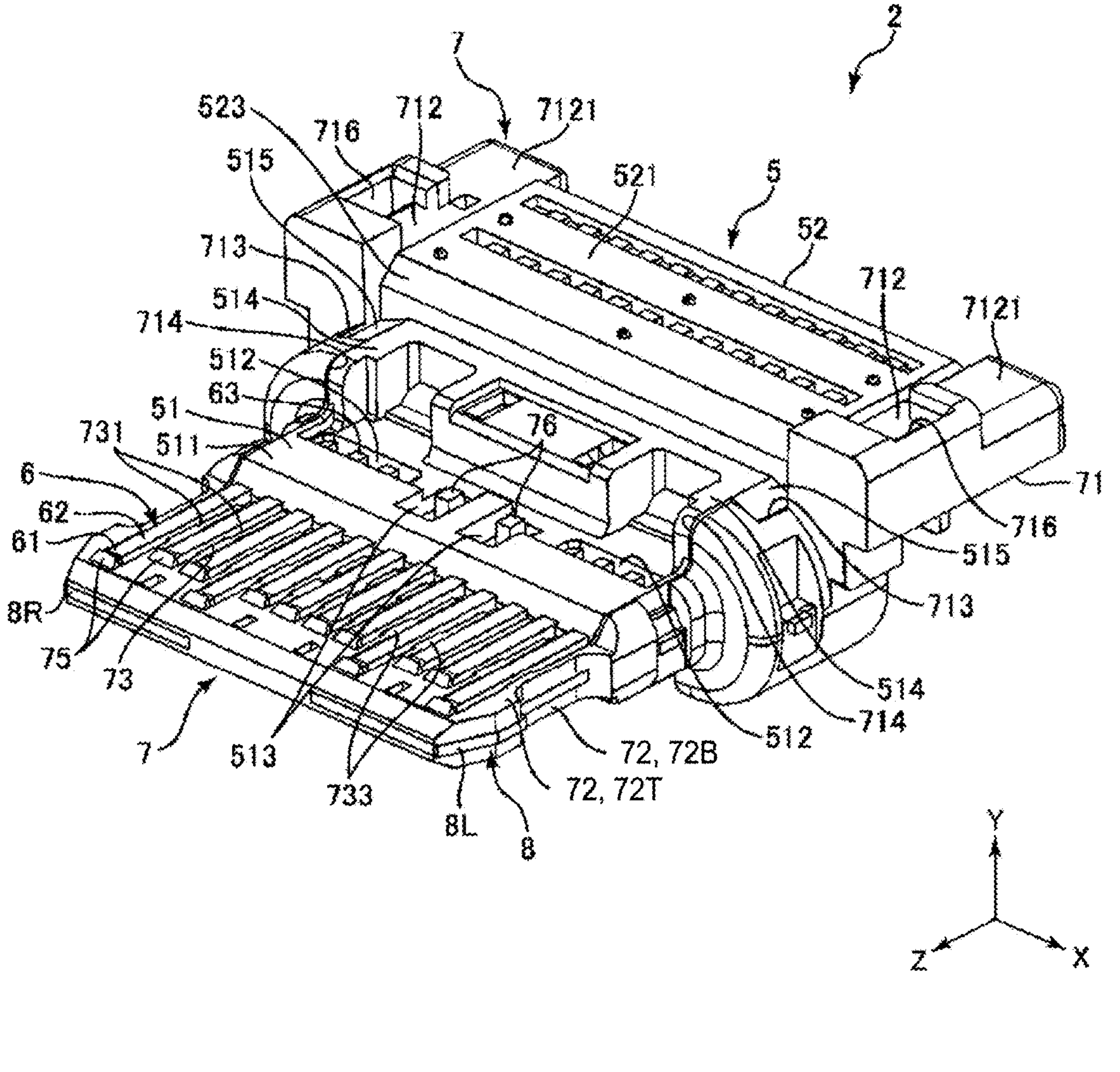
FIG. 10 is a perspective view of the inner structure before a heat welding step is performed to the inner structure.
Figure 11:
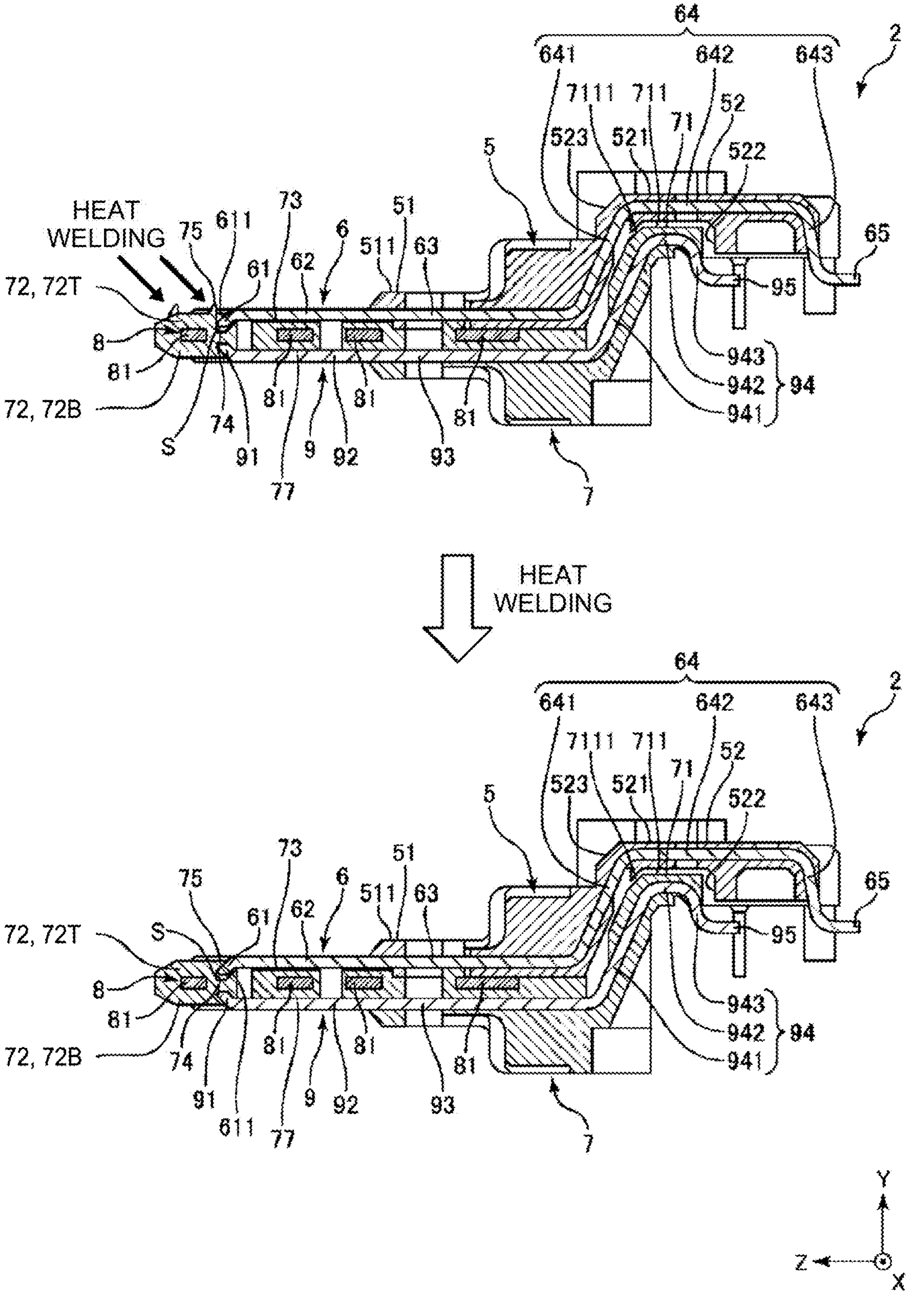
FIG. 11 is a diagram for explaining the first heat welding step to be performed to multiple protrusion sections.
Figure 12:
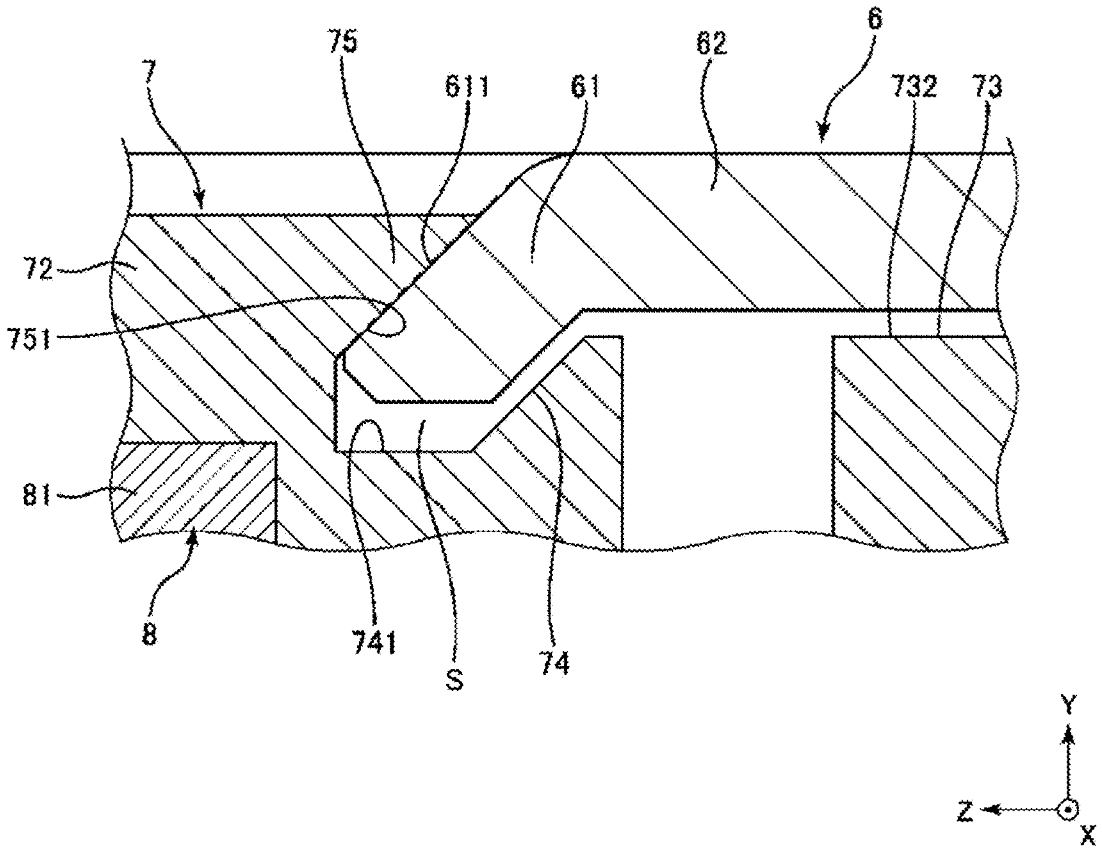
FIG. 12 is an enlarged cross-sectional view of a vicinity of a tip section of the first contact.

First, with reference to FIG. 2 to FIG. 12, the electrical connector according to the embodiment of the present invention is described in detail. FIG. 2 is a perspective view of the electrical connector according to the embodiment of the present invention. FIG. 3 is a cross-sectional view of the A-A line of the electrical connector illustrated in FIG. 2. FIG. 4 is an exploded perspective view of the electrical connector according to the embodiment of the present invention. FIG. 5 is a perspective view of an exploded upper part and lower part of the inner structure illustrated in FIG. 4. FIG. 6 is an exploded perspective view of the upper part illustrated in FIG. 5. FIG. 7 is an exploded perspective view of the lower part illustrated in FIG. 5. FIG. 8 is a perspective view illustrating the lower housing illustrated in FIG. 7 from another angle. FIG. 9 is a perspective view illustrating the lower part illustrated in FIG. 5 from another angle. FIG. 10 is a perspective view of the inner structure before the heat welding step is performed to the inner structure. FIG. 11 is a diagram for explaining the first heat welding step to be performed on the multiple protrusion sections. FIG. 12 is an enlarged cross-sectional view of the vicinity of a tip section of the first contacts.

The electrical connector 1 according to the embodiment of the present invention illustrated in FIG. 2 and FIG. 3 is configured to comply with the specifications defined by the USB Type-C standard. For example, the electrical connector 1 is mounted as a receptacle connector on a circuit board installed inside a casing (not illustrated in the drawings) of an electronic device such as a cell phone, smart phone, portable information terminal, portable music player, or e-book reader. A mating connector is inserted from the tip side (+Z direction side) of the electrical connector 1 to provide an electrical connection between the mating connector and the electrical connector 1.

As illustrated in FIG. 4, the electrical connector 1 includes the inner structure 2, the metal shell 3 that covers the inner structure 2 from the outside and holds the inner structure 2 therein, and the shield member 4 that covers the inner structure 2 and shell 3 from above.

As illustrated in FIG. 5, the inner structure 2 is configured with the upper part 21, which is obtained by holding the multiple first contacts 6 with the upper housing 5, and the lower part 22, which is obtained by holding the ground plate 8 and multiple second contacts 9 with the lower housing 7. From above the lower part 22, the upper part 21 is attached to the lower part 22, and, furthermore, a heat welding step is performed to the lower part 22 in order to obtain the inner structure 2.

As illustrated in FIG. 6, the upper part 21 includes the insulating upper housing and the multiple first contacts 6 held by the upper housing 5. The multiple first contacts 6 are arranged parallel to each other along the X axis direction and are held by the upper housing 5 so as to be apart from each other for insulation. The upper part 21 is obtained by integral molding (insert molding) in which the multiple first contacts 6 are placed within a mold having a shape corresponding to the upper housing 5 and thermoplastic insulating material is poured, so that the multiple first contacts 6 are held by the upper housing 5.

The upper housing 5 includes the tip section 51 located on the tip side and the base end section 52 located on the base end side relative to the tip section 51. The upper housing 5 is formed of thermoplastic insulating material, such as thermoplastic resin (e.g., polyamide (PA), polyphenylene sulfide (PPS), polyethylene (PE), or ABS resin), and is integrated with the multiple first contacts 6 by integral molding.

The tip section 51 includes the plate section 511 extending from the base end section 52 to the tip side, the multiple tie-bar cut holes 512 formed in the plate section 511, the pair of heat welding holes 513 through which the later-described welding protrusion sections 76 (see FIG. 5 and FIG. 7) of the lower housing 7 are inserted, the pair of wall sections 514 extending upward from both sides of the plate section 511 on the base end side, the pair of press-fit sections 515 formed so as to protrude outward from the respective outer surfaces of the pair of wall sections 514, and the pair of press-fit ribs 516 formed so as to protrude outward from the respective outer surfaces of the pair of press-fit sections 515.

The plate section 511 is a flat plate member extending from the tip side of the base end section 52 to the tip side of the upper housing 5 and has a function of internally holding the multiple first contacts 6. Specifically, the plate section 511 internally holds the later-described first horizontal extension sections 63 of the multiple first contacts 6 and is integrated with them, so as to thereby hold the multiple first contacts 6.

The multiple tie-bar cut holes 512 are respectively formed on both sides in the width direction (the X axis direction in the drawings) of the upper face of the plate section 511. When the multiple first contacts 6 and the upper housing 5 are integrally molded to obtain the upper part 21, the multiple first contacts 6 are connected to each other via a connection part. The multiple tie-bar cut holes 512 are used to execute the tie-bar cutting for separating the first contacts 6 from each other by punching out the connection part with a cutter after obtaining the upper part 21 by integral molding.

The pair of heat welding holes 513 are formed approximately at the center in the width direction (the X axis direction in the drawings) of the upper face of the plate section 511, which is between the pair of tie-bar cut holes 512. The pair of heat welding holes 513 are used to respectively insert the pair of welding protrusion sections 76 formed on the lower housing 7. Further, the pair of heat welding holes 513 are used also as tie-bar cut holes for inserting the cutter to execute the tie-bar cutting described above. After the upper part 21 is attached to the lower part 22, the heat welding step is performed to the welding protrusion sections 76 in the state where the welding protrusion sections 76 are respectively inserted into the heat welding holes 513, so that the heat welding holes 513 are partially or completely filled with the melted welding protrusion sections 76, and thus the upper part 21 and the lower part 22 are integrated.

The pair of wall sections 514 extend upward from both sides of the plate section 511 on the base end side and protrude toward the tip side from the tip side of the base end section 52, respectively. When the upper part 21 is attached to the lower part 22, the outer surfaces of the pair of wall sections 514 and the inner surfaces of the pair of wall sections 714 (see FIG. 5 and FIG. 7) of the lower part 22 make contact with each other.

The pair of press-fit sections 515 are formed so as to respectively protrude outward from the respective outer surfaces of the pair of wall sections 514. Furthermore, the outer surfaces of the press-fit sections 515 are continuous with the outer surface of the base end section 52 in a stepless manner. When the upper part 21 is attached to the lower part 22, the pair of press-fit sections 515 are press-fitted into the pair of press-fit grooves 713 of the lower part 22, and thus the upper part 21 is attached to the lower part 22.

The pair of press-fit ribs 516 are formed so as to protrude outward from the respective outer surfaces of the pair of press-fit sections 515. Further, the press-fit ribs 516 extend in the up-down direction (the Y direction) on the outer surfaces of the press-fit sections 515. When the pair of press-fit sections 515 are press-fitted from above into the pair of press-fit grooves 713 of the lower part 22 to attach the upper part 21 to the lower part 22, the pair of press-fit ribs 516 are elastically deformed and pressed against the pair of press-fit grooves 713, respectively. Accordingly, the attachment strength of the upper part 21 to the lower part 22 increases.

The base end section 52 includes the plate section 521 extending from the tip section 51 to the base end side, the engagement concave section 522 formed on the lower face of the plate section 521, and the connection section 523 connecting the plate section 521 and the tip section 51. Further, the base end section 52 is integrally molded with the tip section 51.

The plate section 521 is a flat plate member extending from the tip section 51 to the base end side and has a function of internally holding the multiple first contacts 6. Specifically, the plate section 521 internally holds the later-described bridge section 64 of the multiple first contacts 6 and is integrated with them, so as to thereby hold the multiple first contacts 6.

The engagement concave section 522 is formed on the tip side of the lower face of the base end section 52 and has a concave shape corresponding to the shape of the later-described central section 711 (see FIG. 5 and FIG. 7) of the lower part 22. Since the central section 711 is engaged within the engagement concave section 522, rocking movement of the upper part 21 with respect to the lower part 22 is thereby prevented. The connection section 523 extends diagonally upward from the base end side of the tip section 51 so as to connect the tip section 51 and the base end section 52. Furthermore, in the state where the upper part 21 is attached to the lower part 22, the inner surface of the connection section 523 is in contact with the slope 7111 (see FIG. 5 and FIG. 7) on the tip side of the central section 711 of the lower part 22.

As a whole, each of the multiple first contacts 6 has a bar shape extending linearly along the insertion/removal direction (the Z axis direction) of mating connectors. Since all of the multiple first contacts 6 have the same configuration, one representative first contact 6 is described in detail below. The first contact 6 includes the tip section 61 located at the leading edge (+Z direction side), the contact point section 62 extending horizontally from the base end of the tip section 61 to the base end side to make contact with a corresponding contact of mating connectors, the first horizontal extension section 63 extending horizontally from the contact point section 62 to the base end side (−Z direction side), the bridge section 64 extending from the first horizontal extension section 63 to the base end side, and the terminal section 65 extending from the bridge section 64 to the base end side. Note that the contact point sections 62 and the first horizontal extension sections 63 of the multiple first contacts 6 are all located in the same plane. Hereinafter, in the present specification, the plane in which the contact point sections 62 and the first horizontal extension sections 63 of the multiple first contacts 6 are located is referred to as the "first contact plane".

The tip section 61 is a portion that is located at the leading edge of the first contact 6 and extends diagonally downward from the contact point section 62. As illustrated in FIG. 3 and FIG. 11, the tip section 61 is located within the accommodation concave section 74 formed on the upper face of the tongue-shaped section 72 of the later-described lower housing 7. Thus, in the state where the electrical connector 1 is assembled, the tip section 61 extends from the contact point section 62 toward the corresponding accommodation concave section 74 of the lower housing 7. Returning to FIG. 6, the contact point section 62 is a portion that makes contact with the corresponding contact of a mating connector when the mating connector is inserted from the tip side via the insertion port 311 of the shell 3 in the state where the electrical connector 1 is assembled. Thus, as illustrated in FIG. 4, the upper face of the contact point section 62 is exposed outward (+Y direction) in the state where the inner structure 2 is formed.

Returning to FIG. 6, the first horizontal extension section 63 is a portion that extends horizontally from the base end of the contact point section 62 to the base end side and is embedded within the tip section 51 of the upper housing 5. The bridge section 64 includes the first leg section 641 extending diagonally upward from the base end of the first horizontal extension section 63, the second horizontal extension section 642 extending horizontally from the first leg section 641 to the base end side, and the second leg section 643 extending diagonally downward from the base end of the second horizontal extension section 642 to be connected to the terminal section 65. The first leg section 641, the second horizontal extension section 642, and a part of the second leg section 643 are embedded within the tip section 51 and base end section 52 of the upper housing 5. The terminal section 65 is a portion extending horizontally from the base end of the second leg section 643 to the base end side. When the electrical connector 1 is mounted on a circuit board, the terminal section 65 is connected to a corresponding terminal installed on the circuit board.

As described above, the upper part 21 is obtained by integrally molding the multiple first contacts 6 and the upper housing 5. At the time of integrally molding the upper part 21, each of the multiple first contacts 6 is connected to each other with a connection part in order to prevent misalignment and tilting of the multiple first contacts 6 inside the upper housing 5. Therefore, after the upper part 21 is integrally molded, a cutter is inserted via the tie-bar cut holes 512 and the pair of heat welding holes 513 in the upper housing 5, and the tie-bar cutting is executed for punching out the connection part connecting each of the multiple first contacts 6 to separate the multiple first contacts 6 from each other.

Further, the multiple first contacts 6 include the two high-frequency signal contact pairs CP1 each of which is configured with two high-frequency signal contacts 6A for transmitting high-frequency differential signals to and from mating connectors, the one normal signal contact pair CP2 which is configured with the two normal signal contacts 6B for transmitting normal-frequency differential signals to and from mating connectors, and the multiple non-signal contacts 6C which are used for purposes other than signal transmission.

Each of the two high-frequency signal contact pairs CP1 is configured with two adjacent high-frequency signal contacts 6A. The two high-frequency signal contact pairs CP1 are located on both sides of the electrical connector 1 in the width direction (the X axis direction in the drawings), respectively. Furthermore, the non-signal contacts 6C are arranged on both sides of the two high-frequency signal contact pairs CP1. In FIG. 6, the non-signal contacts 6C respectively located outside the two high-frequency signal contact pairs CP1 are ground terminals that make contact with ground terminals of mating connectors. On the other hand, the non-signal contacts 6C respectively located inside the high-frequency signal contact pairs CP1 are power supply terminals for supplying power to the electrical connector 1.

The one normal signal contact pair CP2 is configured with the two normal signal contacts 6B for transmitting normal-frequency differential signals to and from mating connectors and is arranged between the two high-frequency signal contact pairs CP1. Furthermore, the non-signal contacts 6C are arranged on both sides of the one normal signal contact pair CP2. Each of the non-signal contacts 6C arranged on both sides of the one normal signal contact pair CP2 is an identification contact used to transmit a signal for identifying the electrical connector 1.

As described above, the upper part 21 is obtained by integrally molding the multiple first contacts 6 and the upper housing 5. As illustrated in FIG. 3 and FIG. 5, in the state where the multiple first contacts 6 are integrated with the upper housing 5, the tip sections 61 and contact point sections 62 of the multiple first contacts 6 are exposed and protrude from the plate section 511 of the tip section 51 of the upper housing 5 toward the tip side. Furthermore, a part of the second leg sections 643 and the terminal sections 65 of the multiple first contacts 6 are exposed and protrude from the base end side of the lower face of the base end section 52 of the upper housing 5 toward the base end side.

As illustrated in FIG. 7, the lower part 22 includes the insulating lower housing 7, the ground plate 8 held in the insulating lower housing 7, and the multiple second contacts 9 held by the insulating lower housing 7 and arranged in the same plane parallel to the ground plane in which the ground plate 8 is arranged. The ground plate 8 is held by the lower housing 7 in the ground plane in the state of being apart from the multiple second contacts 9 so as to be insulated from the multiple second contacts 9. Further, the multiple second contacts 9 are arranged so as to be parallel to each other along the X axis direction and are held by the lower housing 7 so as to be apart from each other for insulation. The lower part 22 is obtained by integral molding in which the ground plate 8 and the multiple second contacts 9 are placed within a mold having a shape corresponding to the lower housing 7 and thermoplastic insulating material is poured, so that the ground plate 8 and the multiple second contacts 9 are held by the lower housing 7.

The lower housing 7 is formed of thermoplastic insulating material, such as thermoplastic resin, and is integrated with the ground plate 8 and the multiple second contacts 9 by integral molding. The lower housing 7 includes the base section 71, which is press-fitted into the base end opening 312 (see FIG. 3 and FIG. 4) of the main body section 31 of the shell 3 so as to fix the inner structure 2 to the shell 3, and the tongue-shaped section 72, which extends from the base section 71 toward the tip side.

The base section 71 is a member having an external shape corresponding to the base end opening 312 of the main body section 31 of the shell 3 in the XY plane. After integrating the upper part 21 and lower part 22 to obtain the inner structure 2, the base section 71 is press-fitted into the base end opening 312 of the main body section 31 of the shell 3, so that the inner structure 2 is fixedly accommodated inside the main body section 31 of the shell 3.

The base section 71 includes the central section 711 located in the center of the base section 71, the pair of side sections 712 respectively formed on both sides of the central section 711, the pair of press-fit grooves 713 formed on the respective inner surfaces of the pair of side sections 712, the pair of wall sections 714 respectively extending from the pair of side sections 712 to the tip side, the pair of positioning protrusions 715 protruding downward from the lower faces of the protruding sections 7121 of the pair of side sections 712, and the pair of press-fit holes 716 respectively formed on the upper faces of the pair of side sections 712. Note that all parts of the base section 71 are integrally formed.

The central section 711 is located in the center of the base section 71 with respect to the width direction (the X axis direction in the drawings) and extends upward at the base end side of the tongue-shaped section 72. When the upper part 21 is attached to the lower part 22, the central section 711 is inserted into the engagement concave section 522 of the upper part 21, so that the central section 711 and the engagement concave section 522 are engaged with each other. Further, the tip-side corner of the central section 711 is angled so as to form the slope 7111. When the central section 711 and the engagement concave section 522 are engaged with each other, the slope 7111 makes contact with the inner surface of the connection section 523 of the upper housing 5.

The pair of side sections 712 are respectively formed on both sides of the base section 71 with respect to the width direction (the X axis direction in the drawing) and are respectively connected to both sides of the central section 711 with respect to the width direction (the X axis direction in the drawings). Further, the pair of side sections 712 respectively have the protruding sections 7121 protruding from the upper portions of the side sections 712 toward the base end side. When the inner structure 2 is press-fitted into the shell 3, the tip surfaces of the pair of side sections 712 make contact with the edge of the base end opening 312 of the shell 3.

The pair of press-fit grooves 713 are concave sections formed on the respective inner surfaces of the pair of side sections 712 so as to be located on the tip side relative to the central section 711. As described above, when attaching the upper part 21 to the lower part 22, the pair of press-fit sections 515 of the upper housing 5 are respectively press-fitted into the pair of press-fit grooves 713 from above. Here, the pair of press-fit ribs 516 formed on the outer surfaces of the pair of press-fit sections 515 are elastically deformed (crushed) and pressed against the pair of press-fit grooves 713, respectively. With such a configuration, the upper part 21 is attached to the lower part 22.

The pair of wall sections 714 are portions which extend from the pair of side sections 712 to the tip side and are formed so as to be located on the tip side relative to the pair of press-fit grooves 713. Further, the pair of wall sections 714 extend upward from both sides of the tongue-shaped section 72 with respect to the width direction (the X axis direction in the drawings). When the pair of press-fit sections 515 of the upper housing 5 are press-fitted into the pair of press-fit grooves 713 to attach the upper part 21 to the lower part 22, the inner surfaces of the pair of wall sections 714 respectively make contact with the outer surfaces of the pair of wall sections 514 of the upper housing 5.

The pair of positioning protrusions 715 are the cylindrical portions which protrude downward respectively from the lower faces of the protruding sections 7121 of the pair of side sections 712 and are used for positioning the electrical connector 1 on the circuit board. In the state where the electrical connector 1 is assembled, positioning of the electrical connector 1 on the circuit board is executed by press-fitting the pair of positioning protrusions 715 into a corresponding pair of bosses on the circuit board. The pair of press-fit holes 716 are respectively formed on the upper faces of the pair of side sections 712, and the inner structure 2 is obtained by attaching the upper part 21 to the lower part 22. Furthermore, by respectively inserting the pair of press-fit protrusions 43 (see FIG. 4) of the later-described shield member 4 into the pair of press-fit holes 716 after accommodating the inner structure 2 in the shell 3 by press-fitting the inner structure 2 into the shell 3, the shield member 4 is attached to the inner structure 2.

The tongue-shaped section 72 is a flat plate member extending from the base section 71 in the insertion/removal direction (toward the tip side) of mating connectors. As illustrated in FIG. 7, the tongue-shaped section 72 includes the upper section 72T located above (in the +Y direction) the main body section 81 of the ground plate 8 embedded within the tongue-shaped section 72, the lower section 72B located below (in the −Y direction) the main body section 81 of the ground plate 8, and the multiple tie-bar cut holes 721 formed on the tongue-shaped section 72.

As illustrated in FIG. 7, the upper section 72T includes the contact receiving sections 73 on which the multiple first contacts 6 are respectively placed, the multiple accommodation concave sections 74 formed respectively on the tip sides of the multiple contact receiving sections 73, the multiple protrusion sections 75 respectively extending from the tip surfaces of the multiple accommodation concave sections 74 toward the base end side, and the pair of welding protrusion sections 76 to be integrated with the upper housing 5 by heat welding.

The multiple contact receiving sections 73 are portions formed to respectively hold the multiple first contacts 6 on the upper face of the tongue-shaped section 72. As illustrated in FIG. 10, the multiple first contacts 6 are respectively placed within the multiple contact receiving sections 73 in the state where the upper part 21 is attached to the lower part 22. Returning to FIG. 7, each of the contact receiving sections 73 includes the pair of wall sections 731 installed so as to face each other on the upper face of the tongue-shaped section 72, the groove 732 defined by the inner surfaces of the pair of wall sections 731 and the upper face of the tongue-shaped section 72 and extending in the insertion/removal direction of mating connectors, and the pair of support sections 733 formed on the inner surfaces of the pair of wall sections 731 to support the contact point section 62 of the first contact 6 from both sides.

The pair of support sections 733 are formed so as to protrude from the surfaces of the pair of wall sections 731 facing each other in the middle of the groove 732. The distance between the pair of support sections 733 apart from each other is approximately equal to the width of the first contact 6 (in the X axis direction). Further, the surfaces of the support sections 733 facing the first contacts 6 are flat surfaces parallel to the side faces of the first contact 6. Therefore, in the state where the upper part 21 is attached to the lower part 22, the contact point section 62 of the first contact 6 is nipped and held by the pair of support sections 733 inside the groove 732. Further, the depth of the groove 732 is less than the thickness (thickness in the Y axis direction) of the first contact 6. Therefore, the upper face of the contact point section 62 is exposed outward (upward) from the contact receiving section 73 and makes contact with the corresponding contact of a mating connector when the mating connector is inserted. With such a configuration, rocking movement in the planar direction of the first contacts 6 on the upper face of the tongue-shaped section 72 is prevented, and thus it is ensured to make stable contact with the contacts of the mating connector.

The multiple accommodation concave sections 74 are respectively formed at the tips of the grooves 732 of the multiple contact receiving sections 73 and are concave sections for accommodating the tip sections 61 of the corresponding first contacts 6. In the present embodiment, the shapes of the accommodation concave sections 74 extend diagonally downward to the tip side from the upper face of the tongue-shaped section 72 so as to correspond to the shapes of the tip sections 61. As illustrated in FIG. 3 and FIG. 11, the tip surfaces of the (the surface in the +Z direction) of the accommodation concave sections 74 are flat surfaces orthogonal to the Z direction. Further, the bottom surfaces 741 (see FIG. 12) of the accommodation concave sections 74 are flat surfaces orthogonal to the Y direction.

Note that, as illustrated in FIG. 3 and FIG. 11, although the shapes of the accommodation concave sections 74 extend diagonally downward to the tip side from the upper face of the upper section 72T so as to correspond to the shapes of the tip sections 61, there is not a limitation as such. There are not limitations regarding the shapes of the accommodation concave sections 74 as long as they can accommodate the tip sections 61 of the first contacts 6, and such a form in which the accommodation concave sections 74 have given shapes different from the shapes illustrated in the drawings is also within the scope of the present invention.

As illustrated in FIG. 3 and FIG. 11, the multiple protrusion sections 75 are respectively formed on the upper sections of the tip surfaces of the multiple contact receiving sections 73 on the tongue-shaped section 72, so as to extend from the upper sections of the tip surfaces of the contact receiving sections 73 toward the base end side. In particular, as illustrated in FIG. 12, the lower surfaces 751 of the protrusion sections are in contact with the upper surfaces (contact surfaces) 611 of the tip sections 61 of the first contacts 6. Accordingly, the respective multiple protrusion sections 75 press the upper surfaces 611 of the tip sections 61 of the first contacts 6 located within the accommodation concave sections 74 downward (toward the inside of the accommodation concave sections 74) and thus act as stoppers to lock the tip sections 61 within the accommodation concave sections 74. Further, since the protrusion sections 75 press the tip sections 61 downward, a load of pressing the contact point sections 62 of the first contacts 6 against the upper face of the tongue-shaped section 72 is applied. Thus, the integrity of the contact point sections 62 and the tongue-shaped section 72 is enhanced.

Further, the upper surfaces of the respective protrusion sections 75 are continuous with the upper face of the tongue-shaped section 72 of the lower housing 7 in a stepless manner. Further, the upper surfaces of the respective protrusion sections 75 are located below the upper surfaces of the contact point sections 62 of the first contacts 6. Furthermore, the lower surfaces 751 of the respective protrusion sections 75 are apart from the bottom surfaces 741 of the accommodation concave sections 74, and the tip sections 61 of the first contacts 6 are located between the lower surfaces 751 of the protrusion sections 75 and the bottom surfaces 741 of the accommodation concave sections 74. Further, the protrusion sections 75 have tapered shapes that decrease in thickness as they get apart from the tip surfaces of the accommodation concave sections 74.

Returning to FIG. 7, the pair of welding protrusion sections 76 are portions that protrude upward from the vicinity of the center of the upper face of the tongue-shaped section 72 in the state of being apart from each other. As illustrated in FIG. 10, in the state where the upper part 21 is attached to the lower part 22 to obtain the inner structure 2, the pair of welding protrusion sections 76 are respectively inserted into the pair of heat welding holes 513 of the upper part 21. As described below, the heat welding step is preformed to the welding protrusion sections 76 inserted into the pair of heat welding holes 513 in the state illustrated in FIG. 10. The welding protrusion sections 76 melted by this heat welding step partially or completely fill the inside of the heat welding holes 513 so as to be bonded to the upper housing 5. Accordingly, the upper housing 5 (the upper part 21) and the lower housing 7 (the lower part 22) are integrated.

As illustrated in FIG. 8, the lower section 72B of the tongue-shaped section 72 is located below (the −Y direction) the main body section 81 of the ground plate 8 and includes the multiple embedding sections 77 in which the multiple second contacts 9 are embedded.

The multiple embedding sections 77 are portions in which the multiple second contacts 9 are embedded by integral molding. Each of the multiple embedding sections 77 is bonded to the upper face and side faces of each of the tip sections 91 and the contact point sections 92 of the corresponding second contacts 9. Note that the lower faces (the outer surfaces) of the contact point sections 92 of the multiple second contacts 9 are exposed outward from the corresponding embedding sections 77. Therefore, when a mating connector is inserted to the electrical connector 1, each of the contact point sections 92 of the multiple second contacts 9 can make contact with the corresponding contact of the mating connector.

Returning to FIG. 7, the ground plate 8 includes the first ground plate piece 8L and the second ground plate piece 8R. Each of the first ground plate piece 8L and the second ground plate piece 8R is a flat plate member configured of metal material embedded between the upper section 72T and the lower section 72B of the tongue-shaped section 72 of the lower housing 7. Each of the first ground plate piece 8L and the second ground plate piece 8R includes the flat-plate main body section 81 and the terminal section 82 that extends from the base end of the main body section 81 toward the base end side and is exposed outside the lower housing 7. The terminal section 82 incudes the first leg section 821 extending diagonally upward from an outer portion of the base end of the main body section 81, the horizontal extension section 822 extending horizontally from the base end of the first leg section 821 to the base end side, and the second leg section 823 extending downward from the base end of the horizontal extension section 822.

The first ground plate piece 8L and the second ground plate piece 8R are arranged in the ground plane so as to face each other through the central axis of the electrical connector 1 with respect to the width direction (the X axis direction) of the electrical connector 1, which is orthogonal to the insertion direction (the Z axis direction) of mating connectors. Specifically, the first ground plate piece 8L is located in the ground plane so as to be in an area in the positive direction of the X axis relative to the central axis of the electrical connector 1, and the second ground plate piece 8R is located in the ground plane so as to be in an area in the negative direction of the X axis relative to the central axis of the electrical connector 1.

Note that, when the lower part 22 is integrally molded, the first ground plate piece 8L and the second ground plate piece 8R are connected to each other with one or more connection parts in order to prevent misalignment and tilting of the first ground plate piece 8L and the second ground plate piece 8R inside the lower housing 7. When punching out the connection parts of the multiple second contacts 9 in the tie-bar cutting executed on the lower part 22 after obtaining the lower part 22, the connection parts connecting the first ground plate piece 8L and the second ground plate piece 8R are also punched out simultaneously. Accordingly, the first ground plate piece 8L and the second ground plate piece 8R are held by the lower housing 7 in the state of being separated from each other.

The respective main body sections 81 of the first ground plate piece 8L and the second ground plate piece 8R are embedded between the upper section 72T and the lower section 72B of the tongue-shaped section 72 of the lower housing 7 so as to be parallel to the planes in which the multiple first contacts 6 and the multiple second contacts 9 are arranged, respectively. Further, the main body sections 81 include: the multiple positioning holes 83 for inserting the pins to perform positioning of the multiple second contacts 9 when the lower part 22 is obtained by integrally molding the lower housing 7 so as to hold the first ground plate piece 8L, the second ground plate piece 8R, and the multiple second contacts 9; the tie-bar cut holes 84 for executing the tie-bar cutting to punch out the connection parts of the multiple second contacts 9, which are connected to each other via the connection parts when obtaining the lower part 22 by integrally molding the lower housing 7, so as to separate the multiple second contacts 9 from each other; and the impedance adjustment holes 85 for adjusting the impedance of the high-frequency signal contacts 6A and 9A of the multiple first contacts 6 and the multiple second contacts 9.

There are not limitations in the numbers, positions, and shapes of positioning holes 83, tie-bar cut holes 84, and impedance adjustment holes 85 in the main body sections 81, and they are appropriately set for the integral molding of the lower part 22 as needed. As illustrated in FIG. 7, at least one of the positioning holes 83, tie-bar cut holes 84, and impedance adjustment holes 85 are formed at positions in the respective main body sections 81 of the first ground plate piece 8L and the second ground plate piece 8R corresponding to the multiple first contacts 6 and the second contacts 9, respectively.

As illustrated in FIG. 7, as a whole, the multiple second contacts 9 have a bar shape extending linearly along the insertion/removal direction (the Z axis direction) of mating connectors. Each of the multiple second contacts 9 has basically the same configuration as each of the multiple first contacts 6. Hereinafter, a detailed description is given of the configuration of one representative second contact 9. That is, the second contact 9 includes the tip section 91 located at the leading edge (+Z direction side), the contact point section 92 extending horizontally from the base end of the tip section 91 to the base end side to make contact with a corresponding contact of mating connectors, the first horizontal extension section 93 extending horizontally from the contact point section 92 to the base end side (−Z direction side), the bridge section 94 extending from the first horizontal extension section 93 to the base end side, and the terminal section 95 extending from the bridge section 94 to the base end side. Note that the contact point sections 92 and the first horizontal extension sections 93 of the multiple second contacts 9 are located in the same plane (see FIG. 7). Hereinafter, in the present specification, the plane in which the contact point sections 92 and the first horizontal extension sections 93 of the multiple second contacts 9 are located is referred to as the "second contact plane". The second contact plane is parallel to the first contact plane and the ground plane. Further, the ground plane is located between the first contact plane and the second contact plane so as to be apart from each other.

The tip section 91 is a portion that is located at the leading edge of the second contact 9 and extends diagonally upward from the contact point section 92. The tip section 91 is embedded within the embedding section 77 of the tongue-shaped section 72 of the lower housing 7. The contact point section 92 is a portion that makes contact with the corresponding contact of a mating connector when the mating connector is inserted from the tip side via the insertion port 311 of the shell 3 in the state where the electrical connector 1 is assembled. Thus, the lower face of the contact point section 92 is exposed outward (−Y direction) in the state where the inner structure 2 is formed. Since the contact point section 92 is embedded within the lower section 72B of the tongue-shaped section 72 by integral molding, the upper face and side faces of the contact point section 92 are bonded to the tongue-shaped section 72.

The first horizontal extension section 93 extends horizontally from the base end of the contact point section 92 to the base end side and is embedded within the lower section 72B of the lower housing 7. The bridge section 94 includes the first leg section 941 extending diagonally upward from the base end of the first horizontal extension section 93, the second horizontal extension section 942 extending horizontally from the base end of the first leg section 941 to the base end side, and the second leg section 943 extending diagonally downward from the base end of the second horizontal extension section 942 to be connected to the terminal section 95. Of the bridge section 94, the entirety of the first leg section 941 and the second horizontal extension section 942 as well as a part of the second leg section 943 are embedded within the central section 711 and the pair of side sections 712 of the lower housing 7.

The terminal section 95 is a portion extending horizontally from the base end of the second leg section 943 of the bridge section 94 to the base end side. When the electrical connector 1 is mounted on a circuit board, the terminal section 95 is connected to a corresponding terminal installed on the circuit board. As described above, the lower part 22 is obtained by integrally molding the ground plate 8, the multiple second contacts 9, and the lower housing 7. At the time of integral molding of the lower part 22, each of the multiple second contacts 9 is connected to each other with a connection part in order to prevent misalignment and tilting of the multiple second contacts 9 inside the lower housing 7.

The function of each of the multiple second contacts 9 is the same as the function of each of the first contacts 6 described above. Specifically, as with the multiple first contacts 6, the multiple second contacts 9 include the two high-frequency signal contact pairs CP1 each of which is configured with two high-frequency signal contacts 9A for transmitting high-frequency differential signals to and from mating connectors, the one normal signal contact pair CP2 which is configured with the two normal signal contacts 9B for transmitting normal-frequency differential signals to and from mating connectors, and the multiple non-signal contacts 9C which are used for purposes other than signal transmission. Further, the arrangement of the high-frequency signal contacts 9A, normal signal contacts 9B, and non-signal contacts 9C of the multiple second contacts 9 is the same as that of the multiple first contacts 6 (see FIG. 6 and FIG. 7).

The multiple first contacts 6 and the multiple second contacts 9 are arranged so that the contact point sections 62 of the first contacts 6 and the contact point sections 92 of the second contacts 9 are vertically symmetrical through the ground plate 8 when viewed from the front side (the mating connector side) of the electrical connector 1.

There are not particular limitations in the numbers and arrangements of the multiple high-frequency signal contacts 6A and 9A, the multiple normal signal contacts 6B and 9B, and the multiple non-signal contacts 6C and 9C in the multiple first contacts 6 and the multiple second contacts 9, and the electrical connector 1 is appropriately set according to the standard of the electrical connector.

The multiple tie-bar cut holes 721 are formed on both sides of the tongue-shaped section 72 with respect to the width direction (the X axis direction in the drawings) and on the tip sides of the welding protrusion sections 76, respectively. They are used to execute the tie-bar cutting to punch out the connection parts of the multiple second contacts 9, which are connected to each other via the connection parts when integrally molding the lower part 22, so as to separate the multiple second contacts 9 from each other.

As described above, the lower part 22 is obtained by integrally molding the lower housing 7, the ground plate 8, and the multiple second contacts 9. In the state where the lower housing 7, the ground plate 8, and the multiple second contacts 9 are integrated, the tie-bar cutting is executed for punching out the connection part connecting each of the multiple second contacts 9 through the multiple tie-bar cut holes 721 of the lower housing 7 and the multiple tie-bar cut holes 84 of the ground plate 8 so as to separate the multiple second contacts 9 from each other.

In FIG. 9, the lower part 22 after performing the tie-bar cutting to the multiple second contacts 9 is illustrated. As illustrated in FIG. 9, the lower faces (the outer surfaces) of the contact point sections 92 of the multiple second contacts 9 are exposed outward from the tongue-shaped section 72 of the lower housing 7. Furthermore, a part of the second leg sections 943 and the terminal sections 95 of the multiple second contacts 9 are exposed from the base end side of the lower face of the central section 711 of the lower housing 7 toward the base end side. Furthermore, the terminal sections 82 (the second leg sections 823) of the first ground plate piece 8L and the second ground plate piece 8R are exposed from the lower faces of the protruding sections 7121 of the pair of side sections 712, respectively.

From above the lower part 22, the upper part 21 is attached to the lower part 22, and, furthermore, the heat welding step is performed to the lower part 22 in order to obtain the inner structure 2. The heat welding step for the lower part 22 includes the first heat welding step, in which the multiple protrusion sections 75 are brought into contact with the tip sections 61 of the corresponding first contacts 6, and the second heat welding step, in which the pair of welding protrusion sections 76 are melted to integrate the upper part 21 and lower part 22. Note that there are not particular limitations in the order of the first heat welding step and the second heat welding step. Further, it is also possible that the first heat welding step and the second heat welding step are executed simultaneously.

FIG. 10 is a perspective view of the inner structure 2 after the upper part 21 is attached to the lower part 22 and before the heat welding step is performed to the lower part 22. As illustrated in FIG. 10, in the state before the heat welding step is executed to the lower part 22, the multiple protrusion sections 75 formed on the tongue-shaped section 72 of the lower housing 7 respectively extend upward (the +Y direction) from sections on the tip side adjacent to the tip surfaces of the multiple accommodation concave sections 74. Further, in this state, the base end faces (the faces in the −Z direction) of the protrusion sections 75 are flat surfaces that are continuous with the tip faces of the accommodation concave sections 74 (see the upper side of FIG. 11). Further, the thickness of the protrusion sections 75 gradually decreases from the lower side to the upper side, so that the protrusion sections 75 have tapered shapes extending upward.

In FIG. 11, the first heat welding step for the multiple protrusion sections 75 is schematically illustrated. The upper side of FIG. 11 is a cross-sectional view of the inner structure 2 before the first heat welding step is executed, and the lower side of FIG. 11 is a cross-sectional view of the inner structure 2 after the first heat welding step is executed.

Further, as illustrated in the cross-sectional view on the upper side of FIG. 11, in the state where the upper part 21 is attached to the lower part 22, the contact point sections 62 of the multiple first contacts 6 are respectively placed inside the corresponding contact receiving sections 73 in the tongue-shaped section 72 of the lower housing 7. Furthermore, the respective tip sections 61 of the multiple first contacts 6 are located inside the corresponding accommodation concave sections 74 of the tongue-shaped section 72 of the lower housing 7. Further, since the multiple first contacts 6 and the lower housing 7 are not integrally molded, the contact point sections 62 of the multiple first contacts 6 are not bonded to the tongue-shaped section 72 of the lower housing 7. In the form illustrated in FIG. 12, although there is a gap between the lower face of the contact point section 62 of the multiple first contacts 6 and the upper face of the tongue-shaped section 72, the present invention is not limited as such. As long as the contact point sections 62 of the multiple first contacts 6 are not bonded to the tongue-shaped section 72, the lower faces of the contact point sections 62 of the multiple first contacts 6 and the upper face of the tongue-shaped section 72 may be in contact with each other. On the other hand, the tip sections 91 and contact point sections 92 of the multiple second contacts 9 are located inside the embedding sections 77 formed on the lower face of the tongue-shaped section 72.

As illustrated in FIG. 11, by heating and pressing the multiple protrusion sections 75, the multiple protrusion sections 75 are melted and brought into contact with the tip sections 61 of the corresponding first contacts 6, respectively. By the first heat welding step as described above, the multiple protrusion sections 75 respectively extend from the upper sections of the tip surfaces of the accommodation concave sections 74 toward the base end side and are bonded to and integrated with the tip sections 61 of the corresponding first contacts 6 as in the state illustrated in the lower side of FIG. 11.

FIG. 12 is an enlarged cross-sectional view of the vicinity of a tip section of the first contacts 6 after the first heat welding step is executed. After the upper part 21 and lower part 22 are attached, the first heat welding step is performed from above to the protrusion sections 75 respectively extending upward (the +Y direction) from the portions on the tip side adjacent to the tip surfaces of the multiple accommodation concave sections 74. The multiple protrusion sections 75 configured of thermoplastic insulating material are heated and pressed so as to be melted and deformed by this first heat welding step, and thus the protrusion sections 75 have the shapes extending from the upper sections of the tip surfaces of the multiple accommodation concave sections 74 toward the base end side. In this state, the respective lower surfaces 751 of the multiple protrusion sections 75 and the upper surfaces (contact surfaces) 611 of the tip sections 61 of the corresponding first contacts 6 are bonded and integrated. The multiple protrusion sections 75 respectively contact and press the upper surfaces (contact surfaces) 611 of the tip sections 61 of the corresponding first contacts 6 from above (outside), and thus a load is generated on the contact point sections 62 of the corresponding first contacts 6 such that the contact point sections 62 are pressed onto the upper face of the tongue-shaped section 72 of the lower housing 7. Accordingly, the integrity of the contact point sections 62 of the multiple first contacts 6 and the tongue-shaped section 72 of the lower housing 7 is enhanced, and thus buckling and deformation of the contact point sections 62 can be prevented.

As illustrated in the upper side of FIG. 11, each of the accommodation concave sections 74 opens upward before executing the first heat welding step. On the other hand, as illustrated in the lower side of FIG. 11, after executing the first heat welding step, each of the multiple protrusion sections 75 melted and deformed by the first heat welding step covers the upper surface (contact surface) 611 of the tip section 61 of the corresponding first contact 6, and thus the opening of each of the accommodation concave sections 74 becomes smaller or is closed.

The multiple protrusion sections 75 are respectively in contact with the upper surfaces (contact surfaces) 611 of the tip sections 61 of the corresponding first contacts 6 so as to cover at least 3%, preferably 10%, more preferably 50%, of the area of the upper surfaces (contact surfaces) 611 of the tip sections 61 of the corresponding first contacts 6.

In the stage before executing the first heat welding step illustrated on the upper side of FIG. 11, the multiple protrusion sections 75 respectively have tapered shapes which extend upward and whose thickness gradually decreases from below to above. Further, in the stage before executing the first heat welding step, the widths in the X axis direction of the base ends of the multiple protrusion sections 75 are approximately equal to the widths in the X axis direction of the contact receiving sections 73. Further, on the upper face of the tongue-shaped section 72, one protrusion section 75 is installed at a portion on the tip side adjacent to the tip surface of each accommodation concave section 74. However, there are not particular limitations in the shape, dimensions, and number of the protrusion sections 75 as long as the multiple protrusion sections 75 are in contact with the tip sections 61 of the corresponding first contacts 6 located inside the accommodation concave sections 74 after the first heat welding step so that the integrity of the contact point sections 62 of the corresponding first contacts 6 and the tongue-shaped section 72 of the lower housing 7 is improved. The scope of the present invention also includes such forms in which the shape, dimensions, and number of protrusion sections 75 are modified.

Continuing to refer to FIG. 12, the respective tip sections 61 of the multiple first contacts 6 extend (protrude) diagonally downward (toward the bottom surfaces 741 of the accommodation concave sections 74) from the contact point sections 62 so as to be accommodated within the accommodation concave sections 74. In the present embodiment, the gap S is formed between the respective tip sections 61 of the multiple first contacts 6 and the bottom surfaces 741 of the accommodation concave sections 74. Further, since the multiple first contacts 6 are not integrally molded with the lower housing 7, the lower faces (the faces in the −Y direction) and side faces of the contact point sections 62 of the first contacts 6 are not bonded to the upper face (the face in the +Y direction) of the upper section 72T of the tongue-shaped section 72 of the lower housing 7.

Thus, in the electrical connector 1 of the present invention, the multiple protrusion sections 75 formed on the tongue-shaped section 72 of the lower housing 7 are respectively in contact with the upper surfaces (the contact surfaces) 611 of the tip sections 61 of the corresponding first contacts 6. With such a configuration, in the contact point sections 62 of the corresponding first contacts 6, such a load to press the contact point sections 62 onto the tongue-shaped section 72 is generated, so that the integrity of the contact point sections 62 and the tongue-shaped section 72 is enhanced, and buckling and deformation of the contact point sections 62 are prevented.

Returning to FIG. 4, the shell 3 is a flat cylindrical member configured of metal material. The shell 3 covers the inner structure 2 from the outside and is used to fix the electrical connector 1 onto a circuit board of an electronic device. The shell 3 accommodates the inner structure 2 therein in the state of covering the inner structure 2, except for the tip side and base end side with respect to the insertion/removal direction (Z direction) of mating connectors.

The shell 3 has the cylindrical main body section 31 and the pair of shell leg sections 32 formed to protrude outward from the lateral sides of the upper face of the main body section 31 and extend downward in a stepped manner.

The main body section 31 of the shell 3 has a flat cylindrical shape. The inner structure 2 is accommodated in the space defined by the inner surface of the cylindrical shape of the main body section 31. The insertion port 311 is formed to accept a mating connector on the tip side of the main body section 31. On the other hand, the base end opening 312 for guiding the multiple first contacts 6, multiple second contacts 9, and ground plate 8 of the inner structure 2 accommodated inside the shell 3 to the circuit board of an electronic device is formed on the base end side of the main body section 31.

In the state where the electrical connector 1 is assembled, the inner structure 2 is accommodated inside the main body section 31. The terminal sections 65 of the multiple first contacts 6, the terminal sections 95 of the multiple second contacts 9, and the terminal sections 82 of the ground plate 8 extend outward via the base end opening 312 of the main body section 31. Furthermore, by connecting the terminal sections 65 of the multiple first contacts 6, the terminal sections 95 of the multiple second contacts 9, and the terminal sections 82 of the ground plate 8 to the circuit board of an electronic device, the electrical connector 1 is mounted on the circuit board of the electronic device.

The shell leg sections 32 of the shell 3 are used to fix the electrical connector 1 onto the circuit board of an electronic device. In the state where the electrical connector 1 is assembled, the shell leg sections 32 of the shell 3 are inserted into engagement holes formed on the circuit board of an electronic device, so that the electrical connector 1 is fixed onto the circuit board of the electronic device. The shell leg sections 32 are formed to protrude outward in a stepped manner from edge sections on the lateral sides of the upper face of the main body section 31.

The shield member 4 has a function of covering the shell 3 and the inner structure 2 from above in order to provide electromagnetic shielding (EMC) for these components. Furthermore, the shield member 4 has a function of fixing the electrical connector 1 onto a circuit board installed in a casing of an electronic device. The shield member 4 is configured of metal material. The shield member 4 has the main body section 41, the pair of screw insertion holes 42, the pair of press-fit protrusions 43, and the pair of shield leg sections 44.

The main body section 41 is a flat plate and has the tip section 411 covering the upper face of the shell 3, the base end section 412 covering the upper faces of the base end section 52 of the upper housing 5 and the pair of side sections 712 of the lower housing 7 of the inner structure 2, and the pair of coupling sections 413 for coupling the tip section 411 and the base end section 412.

The pair of press-fit protrusions 43 are formed to protrude outward respectively from both sides of the lateral tip sections on the base end section 412. The pair of press-fit protrusions 43 have the horizontal extension sections 431 extending outward in the horizontal direction (in the X axis direction) from the lateral end sections on the upper face of the base end section 412 and the downward extension sections 432 extending downward from the horizontal extension sections 431. When attaching the shield member 4 to the inner structure 2 and the shell 3, the downward extension sections 432 of the pair of press-fit projections 43 are respectively press-fitted into the pair of press-fit holes 716 (see FIG. 4), which are respectively formed in the upper faces of the pair of side sections 712 of the lower housing 7 of the inner structure 2.

The pair of shield leg sections 44 are formed so as to protrude outward respectively from both sides of the base end of the base end section 412. The pair of shield leg sections 44 have the horizontal extension sections 441 extending outward in the horizontal direction (in the X axis direction) from the lateral end sections on the upper face of the base end section 412 and the downward extension sections 442 extending downward from the horizontal extension sections 441. When the electrical connector 1 is mounted on a circuit board, the downward extension sections 442 of the pair of shield leg sections 44 are connected to corresponding terminals installed on the circuit board.

Figure 13:
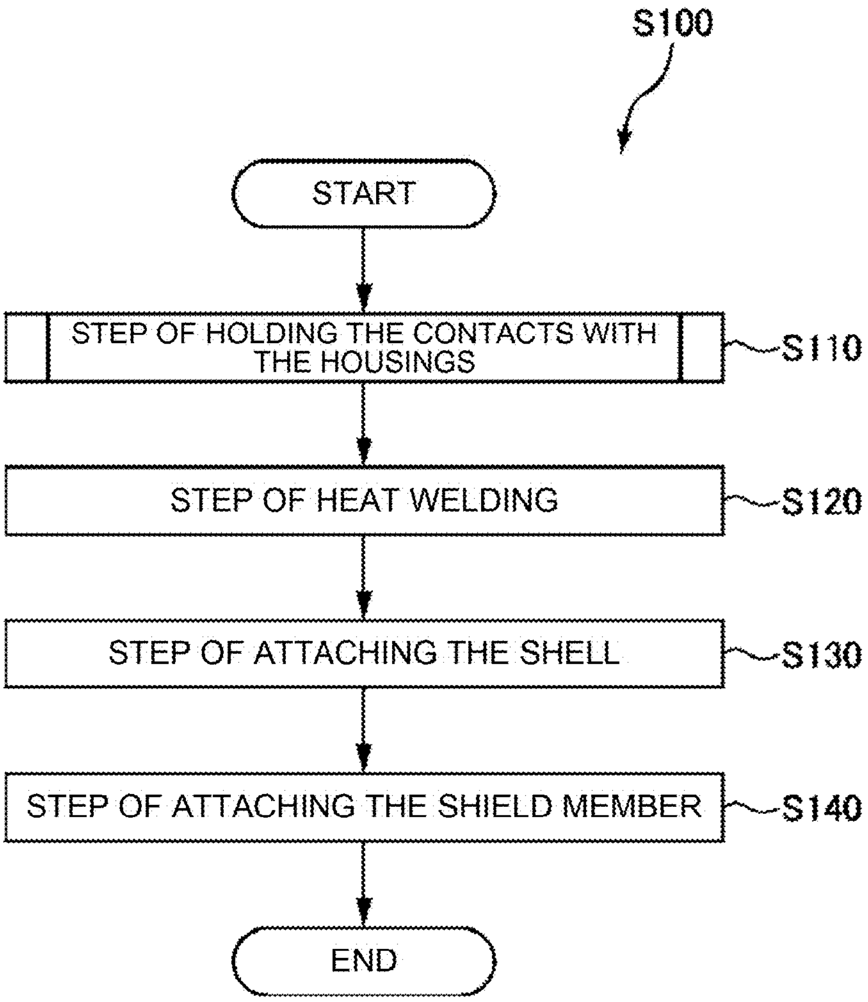
FIG. 13 is a flowchart illustrating a method for manufacturing the electrical connector of the present invention.
Figure 14:
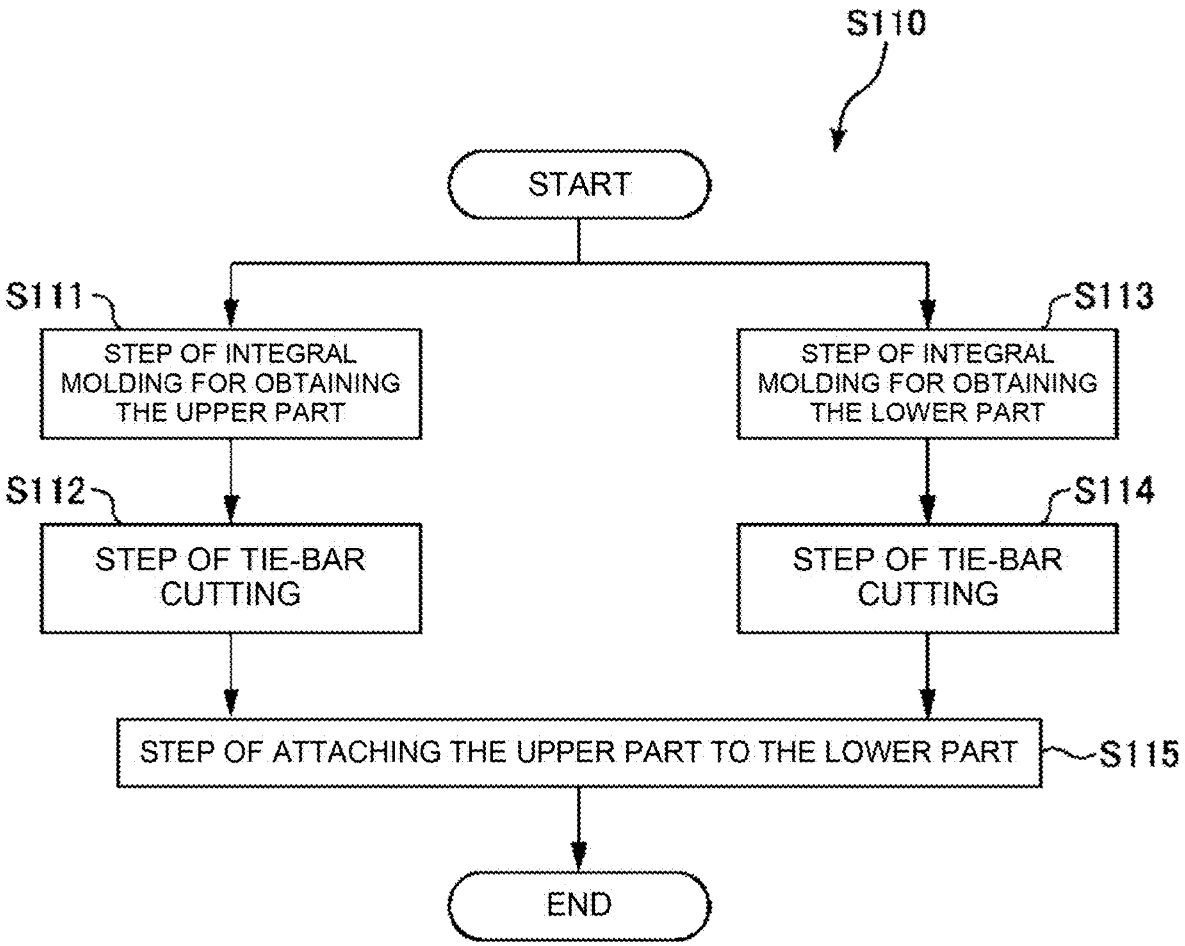
FIG. 14 is a flowchart of the step of installing contacts in housings illustrated in FIG. 13.
Figure 15:
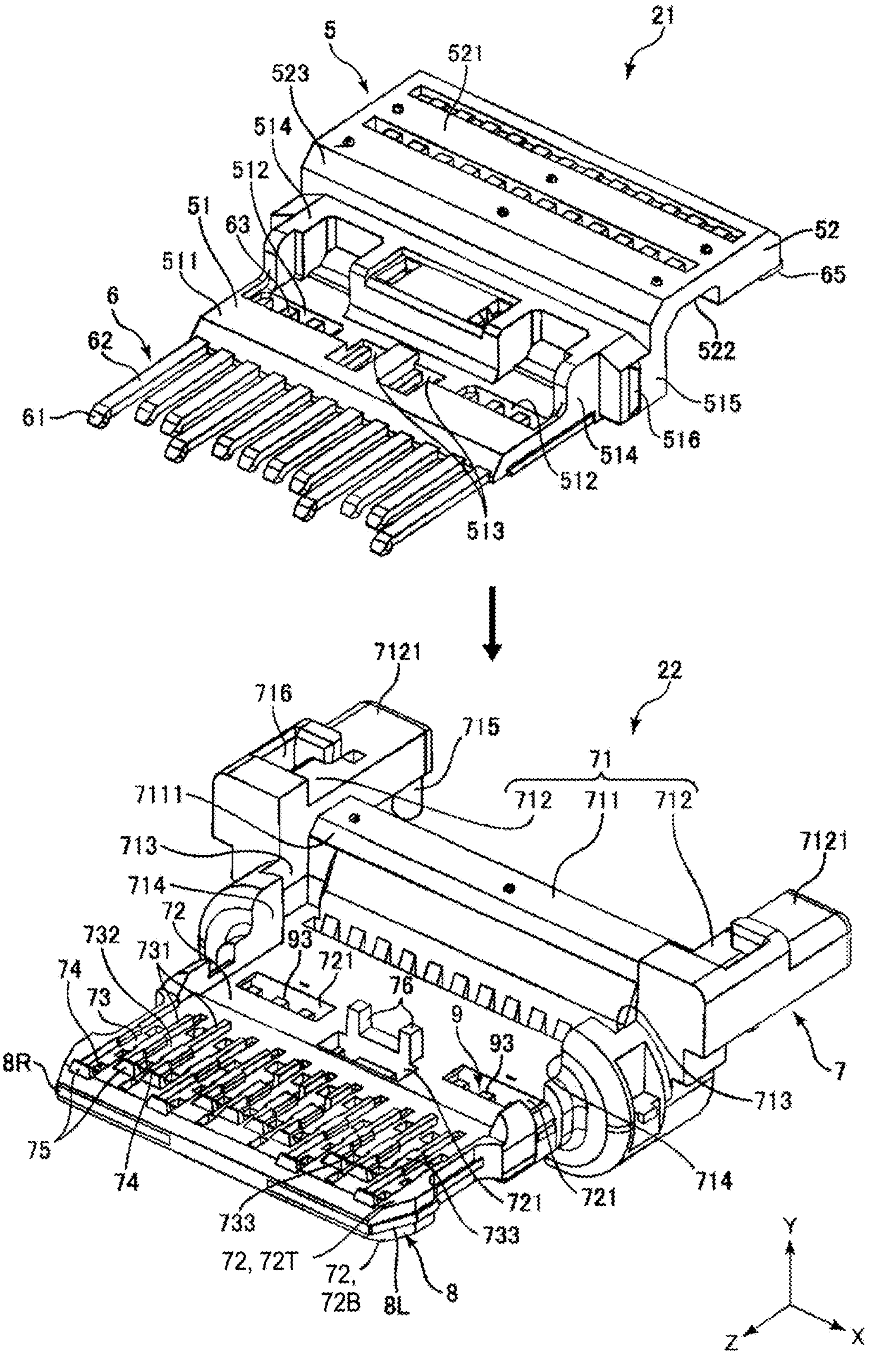
FIG. 15 is a diagram for explaining a step of attaching the upper part to the lower part.

Next, with reference to FIG. 13 to FIG. 15, an explanation is given of the manufacturing method S100 of the electrical connector 1 according to the present invention. FIG. 13 is a flowchart illustrating the manufacturing method S100 of the electrical connector 1 of the present invention. FIG. 14 is a flowchart of the step of installing the contacts in the housings, which is illustrated in FIG. 13. FIG. 15 is a diagram for explaining the step of attaching the upper part 21 to the lower part 22.

In Step S110, the multiple first contacts 6 are held by the upper housing 5, and, furthermore, the multiple second contacts 9 are held by the lower housing 7. In FIG. 14, Step S110 is illustrated in more detail. In Step S111, the upper housing 5 and the multiple first contacts 6 are integrally molded to obtain the upper part 21. Specifically, integral molding is executed in Step S111, in which the multiple first contacts 6 are placed within a mold having a shape corresponding to the upper housing 5 and thermoplastic insulating material is poured into the mold. With such integral molding, the first horizontal extension sections 63 and the bridge sections 64 of the multiple first contacts 6 are embedded within the tip section 51 and base end section 52 of the upper housing 5, respectively. Accordingly, the multiple first contacts 6 are held by the upper housing 5. Note that, in the stage of Step S111, each of the multiple first contacts 6 is connected to each other with a connection part in order to prevent misalignment and tilting of the multiple first contacts 6 in the upper housing 5.

Next, in Step S112, tie-bar cutting is performed to the upper part 21 to punch out the connection part connecting the multiple first contacts 6 to each other. Specifically, cutters for the tie-bar cutting are respectively inserted into the tie-bar cut holes 512 and the pair of heat welding holes 513 in the upper housing 5, and the connection part connecting each of the multiple first contacts 6 is punched out. By such tie-bar cutting, the multiple first contacts 6 held by the upper housing 5 are separated from each other, so as to be held by the upper housing 5 in the state of being insulated from each other.

On the other hand, in Step S113, the lower housing 7, the multiple second contacts 9, and the ground plate 8, which is configured with the first ground plate piece 8L and the second ground plate piece 8R, are integrally molded to obtain the lower part 22. Specifically, integral molding is executed in Step S113, in which the ground plate 8 and the multiple second contacts 9 are placed within a mold having a shape corresponding to the lower housing 7 and thermoplastic insulating material is poured into the mold. With such integral molding, the tip sections 91, the contact point sections 92 (other than the lower faces), the first horizontal extension sections 93, and the bridge sections 94 of the multiple second contacts 9 are embedded within the lower section 72B of the lower housing 7. Accordingly, the multiple second contacts 9 and the ground plate 8 are held by the lower housing 7. Note that, in the stage of Step S113, each of the multiple second contacts 9 is connected to each other with a connection part in order to prevent misalignment and tilting of the multiple second contacts 9 inside the lower housing 7. Further, in the stage of Step S113, the first ground plate piece 8L and the second ground plate piece 8R are connected to each other with one or more connection parts in order to prevent misalignment and tilting of the first ground plate piece 8L and the second ground plate piece 8R inside the lower housing 7.

Next, in Step S114, tie-bar cutting is performed to the lower part 22 to punch out the connection part connecting the multiple second contacts 9 to each other and the one or more connection parts connecting the first ground plate piece 8L and the second ground plate piece 8R to each other. Specifically, the cutters for tie-bar cutting are inserted into the tie-bar cut holes 721 of the lower housing 7 and the tie-bar cut holes 84 of the ground plate 8, respectively, and the contact part connecting each of the multiple second contacts 9 and the one or more connection parts connecting the first ground plate piece 8L and the second ground plate piece 8R to each other are punched out. By such tie-bar cutting, the multiple second contacts 9 held by the lower housing 7 are separated from each other, and, furthermore, the first ground plate piece 8L and the second ground plate piece 8R are separated from each other. As a result, the multiple second contacts 9, the first ground plate piece 8L, and the second ground plate piece 8R are held by the lower housing 7 in the state of being insulated from each other.

Note that the obtainment of the upper part 21 by Step S111 and Step S112 and the obtainment of the lower part 22 by Step S113 and Step S114 may be performed separately or simultaneously. Further, there are not particular limitations regarding the order of execution of the obtainment of the upper part 21 by Step S111 and Step S112 and the obtainment of the lower part 22 by Step S113 and Step S114.

Once the upper part 21 and lower part 22 are obtained, the upper part 21 is attached to the lower part 22 in Step S115. In FIG. 15, the attachment of the upper part 21 to the lower part 22 in Step S115 is schematically illustrated. Note that, as described above, at this stage, the multiple protrusion sections 75 formed on the tongue-shaped section 72 of the lower housing 7 extend upward (the +Y direction) from the tip surfaces of the multiple accommodation concave sections 74.

In the state illustrated in FIG. 15, the pair of press-fit sections 515 of the upper part 21 are press-fitted from above into the pair of press-fit grooves 713 of the lower part 22. Here, the pair of press-fit ribs 516 respectively formed on the outer surfaces of the pair of press-fit sections 515 are elastically deformed and pressed against the pair of press-fit grooves 713, respectively. Accordingly, the upper part 21 is attached to the lower part 22. Furthermore, the pair of heat welding protrusion sections 76 formed on the tongue-shaped section 72 of the lower housing 7 are inserted into the pair of heat welding holes 513 of the upper housing 5, respectively.

When the upper part 21 is attached to the lower part 22, the heat welding step is executed in Step S120 illustrated in FIG. 13, in which the heat welding (heat caulking) process is performed to the multiple protrusion sections 75 and the pair of welding protrusion sections 76, which extend upward from the tongue-shaped section 72 of the lower housing 7. The heat welding step in Step S120 includes the first heat welding step, in which the multiple protrusion sections 75 are heated and pressed so that the multiple protrusion sections 75 are respectively brought into contact with the tip sections 61 of the corresponding first contacts 6, and the second heat welding step, in which the pair of welding protrusion sections 76 are heated and pressed so that the pair of welding protrusion sections 76 are welded to the upper housing 5 and thus the upper housing 5 and the lower housing 7 are integrated. The first heat welding step is executed by pressing a heated metal plate against the multiple protrusion sections 75, for example. Similarly, the second heat welding step is executed by pressing a heated metal plate against the pair of welding protrusion sections 76, for example. Note that there are not particular limitations regarding the order of execution of the first heat welding step and the second heat welding step, and the first heat welding step and the second heat welding step may be performed individually or simultaneously.

In the first heat welding step, the multiple protrusion sections 75 are melted and deformed by being heated and pressed, so as to make contact with the tip sections 61 of the corresponding first contacts 6 from above to be bonded to the tip sections 61. Accordingly, the multiple protrusion sections 75 and the tip sections 61 of the corresponding first contacts 6 are integrated.

As illustrated in FIG. 12, the first heat welding step causes the multiple protrusion sections 75 to extend from the upper sections of the tip surfaces of the corresponding accommodation concave sections 74 toward the base end side. Therefore, the lower surfaces 751 of the multiple protrusion sections 75 make contact with the upper surfaces 611 of the tip sections 61 from above the tip sections 61 of the corresponding first contacts 6 located inside the accommodation concave sections 74. As a result, the tip sections 61 of the multiple first contacts 6 are respectively pressed downward by the multiple protrusion sections 75, and thus such a load to press the contact point sections 62 of the multiple first contacts 6 onto the tongue-shaped section 72 of the lower housing 7 is imposed on the contact point sections 62 of the multiple first contacts 6, so that the integrity of the contact point sections 62 and the tongue-shaped section 72 is enhanced. Therefore, buckling and deformation of the contact point sections 62 of the first contacts 6 can be prevented.

Furthermore, the pair of welding protrusion sections 76 of the lower housing 7 are melted by the second heat welding step, and the inside of the pair of heat welding holes 513 of the upper housing 5 is partially or completely filled, so that the upper part 21 and the lower part 22 are integrated.

Thereafter, in Step S130, the inner structure 2 is inserted through the base end opening 312 of the shell 3, so as to be attached. In Step S140, the shield member 4 is attached to the upper face of the inner structure 2 and the shell 3, and thus the manufacturing/assembly of the electrical connector 1 ends.

As described above, in the electrical connector 1 of the present invention, the protrusion sections 75 installed on the tongue-shaped section 72 of the lower housing 7 are in contact with the tip sections 61 of the multiple first contacts 6, which are respectively located within the multiple accommodation concave sections 74 formed on the tongue-shaped section 72 of the lower housing 7. With such a configuration, in the contact point sections 62 of the multiple first contacts 6, such a load to press the contact point sections 62 onto the tongue-shaped section 72 is generated, so that the integrity of the contact point sections 62 and the tongue-shaped section 72 is enhanced, and buckling and deformation of the contact point sections 62 are prevented. As a result, buckling or deformation of the contact point sections 62 of the multiple first contacts 6 when a mating connector is inserted into the electrical connector 1 can be prevented. Therefore, the reliability of the connection between the electrical connector 1 and the contacts of the mating connector can be improved, and, furthermore, the product life of the electrical connector 1 can be extended.

Furthermore, in the electrical connector 1 obtained by the method for manufacturing the electrical connector according to the present invention, unlike the conventional technology, it is not necessary to execute integral molding for simultaneously integrating a number of parts including the multiple first contacts 6 in order to prevent buckling or deformation of the contact point sections 62 of the multiple first contacts 6 installed on the tongue-shaped section 72 of the lower housing 7. Therefore, the electrical connector 1 can be easily manufactured without the need to execute such a technically difficult integral molding in which a number of parts are simultaneously integrated as in the conventional technology. Furthermore, the manufacturing cost of the electrical connector 1 can be reduced because expensive molds with complex structures for simultaneously integrating a number of parts are no longer necessary.

Note that, in the above-described embodiment, although the multiple second contacts 9 are integrally molded with the lower housing 7 and thus the contact point sections 92 of the multiple second contacts 9 are bonded to the tongue-shaped section 72 of the lower housing 7 so that the integrity of the contact point sections 92 with the tongue-shaped section 72 is thereby enhanced, the present invention is not limited as such. The scope of the present invention also includes such forms in which the multiple second contacts 9 are held by the lower housing 7 such that the contact point sections 92 of the multiple second contacts 9 are not bonded to the tongue-shaped section 72 (for example, by a given method such as press-fitting or the like). In this case, the scope of the present invention also includes such forms in which multiple contact receiving sections and multiple protrusion sections that are respectively similar to the multiple contact receiving sections 73 and the multiple protrusion sections 75 installed on the upper face of the upper section 72T of the tongue-shaped section 72 are formed on the lower face of the lower section 72B of the tongue-shaped section 72, and the multiple protrusion sections respectively make contact from below (outside) with the tip sections 91 of the corresponding second contacts 9 located within the contact receiving sections, so that the integrity of the contact point sections 92 of the multiple second contacts 9 and the tongue-shaped section 72 is thereby enhanced.

Although the electrical connector and the method for manufacturing the electrical connector of the present invention are explained above based on the embodiment illustrated in the drawings, the present invention is not limited as such. It is possible that each configuration of the present invention is replaced with a given part that can exert a similar function, or a part with a given configuration can be added to each configuration of the present invention.

Those skilled in the field and art to which the present invention belongs would be able to implement modifications in the configurations of the electrical connector of the described present invention without significantly departing from the principle, idea, and scope of the present invention. Further, an electrical connector having a modified configuration is also within the scope of the present invention.

Further, the number and types of constituent elements of the electrical connector illustrated in FIG. 2 to FIG. 12 are merely examples for the explanation, and the present invention is not necessarily limited as such. To the extent that does not depart from the principle and intent of the present invention, forms in which given constituent elements are added or combined or in which given constituent elements are deleted are also within the scope of the present invention.

What is claimed is:

1. An electrical connector that can be engaged with a mating connector inserted from a tip side, the electrical connector comprising: an insulating housing including a base section, a tongue-shaped section extending from the base section in an insertion/removal direction of the mating connector, a plurality of accommodation concave sections formed on the tongue-shaped section, and a plurality of protrusion sections installed on the tongue-shaped section; and a plurality of contacts held on the tongue-shaped section of the housing so as to be arranged on a contact plane and extend linearly along the insertion/removal direction of the mating connector, wherein the plurality of accommodation concave sections have shapes to accommodate tip sections of the plurality of contacts within, and the tip sections of the plurality of contacts are respectively located accommodated within the plurality of accommodation concave sections, the plurality of protrusion sections of the housing extend upwards from upper sections of tip surfaces of the plurality of accommodation concave sections and then bent towards a base end side and are in contact with upper surfaces of the tip sections of the plurality of contacts accommodated within the plurality of accommodation concave sections, and the plurality of contacts are not bonded to the tongue-shaped section of the housing.

2. The electrical connector according to claim 1, wherein a gap is formed between respective bottom surfaces of the plurality of accommodation concave sections formed on the tongue-shaped section of the housing and the tip sections of the corresponding contacts.

3. The electrical connector according to claim 1, wherein the plurality of protrusion sections and the tip sections of the corresponding contacts are bonded to be integrated.

4. The electrical connector according to claim 1, wherein the plurality of protrusion sections of the housing are respectively in contact with upper surfaces of the tip sections of the corresponding contacts, so as to cover at least 3% of areas of the upper surfaces of the tip sections of the corresponding contacts.

5. The electrical connector according to claim 1, wherein the plurality of contacts respectively have the tip sections accommodated within the corresponding accommodation concave sections, contact point sections that extend from the tip section toward the base end side and make contact with corresponding contacts of the mating connector, first horizontal extension sections extending horizontally from the contact point sections to the base end side, bridge sections extending from the first horizontal extension sections to the base end side, and terminal sections extending from the bridge sections to the base end side, the bridge sections have first leg sections extending diagonally upward from the first horizontal extension sections, second horizontal extension sections extending horizontally from the first leg sections to the base end side, and second leg sections extending diagonally downward from the second horizontal extension sections to be connected to the terminal sections.

6. The electrical connector according to claim 5, wherein the respective tip sections of the plurality of contacts extend from the contact point sections toward the inside of the corresponding accommodation concave sections of the housing, and the plurality of protrusion sections of the housing respectively press contact upper surfaces of the tip sections of the corresponding contacts toward the inside of the accommodation concave sections of the housing.

7. The electrical connector according to claim 5, wherein the contact point sections of the plurality of contacts are exposed outward on the tongue-shaped section of the housing, and the first horizontal extension sections and the bridge sections of the plurality of contacts are embedded within the base section of the housing.

8. The electrical connector according to claim 1, wherein the contact plane includes a first contact plane and a second contact plane parallel to the first contact plane, the plurality of contacts include a plurality of first contacts arranged on the first contact plane and a plurality of second contacts arranged on the second contact plane, the housing includes an upper housing that holds the plurality of first contacts and a lower housing that holds the plurality of second contacts, the tongue-shaped section, the plurality of accommodation concave sections, and the plurality of protrusion sections of the housing are included in the lower housing, the upper housing is attached to the lower housing so that the plurality of first contacts held by the upper housing are located on an upper face of the tongue-shaped section of the lower housing, and the plurality of second contacts are held on a lower face of the tongue-shaped section of the lower housing.

9. The electrical connector according to claim 8, wherein the lower housing has a welding protrusion section to be integrated with the upper housing, and the welding protrusion section of the lower housing is bonded to the upper housing, so that the upper housing and the lower housing are thereby integrated.

10. A method for manufacturing an electrical connector, the method comprising:

using an insulating housing including a base section, a tongue-shaped section extending from the base section in an insertion/removal direction of a mating connector, a plurality of accommodation concave sections formed on the tongue-shaped section, and a plurality of protrusion sections installed on the tongue-shaped section, so as to hold the plurality of contacts on the tongue-shaped section of the housing so that tip sections of the plurality of contacts are respectively located within the plurality of accommodation concave sections; and heat welding of heating and pressing the plurality of protrusion sections of the housing so that the plurality of protrusion sections of the housing are respectively brought into contact with the tip sections of the corresponding contacts, wherein, after the heat welding, the plurality of protrusion sections of the housing respectively extend from tip surfaces of the plurality of accommodation concave sections toward a base end side and, furthermore, are in contact with the tip sections of the corresponding contacts respectively located within the plurality of accommodation concave sections, and the plurality of contacts are not bonded to the tongue-shaped section of the housing.

11. The method for manufacturing the electrical connector according to claim 10, wherein, in the heat welding, the plurality of protrusion sections of the housing are heated and pressed so that the plurality of protrusion sections of the housing are thereby melted and deformed, and the plurality of protrusion sections of the housing and the tip sections of the plurality of contacts are respectively bonded so that the plurality of protrusion sections of the housing and the tip sections of the plurality of contacts are thereby integrated.

12. The method for manufacturing the electrical connector according to claim 10, wherein the plurality of contacts include a plurality of first contacts arranged on a first contact plane and a plurality of second contacts arranged on a second contact plane which is parallel to the first contact plane, the housing includes an upper housing that holds the plurality of first contacts and a lower housing that holds the plurality of second contacts, the using the housing to hold the plurality of contacts includes integrally molding the plurality of first contacts and the upper housing so as to obtain an upper part in which the plurality of first contacts are held, integrally molding the plurality of second contacts and the lower housing so as to obtain a lower part in which the plurality of second contacts are held, and attaching the upper part to the lower part.

13. The method for manufacturing the electrical connector according to claim 12, wherein the lower housing has a welding protrusion section to be integrated with the upper housing by the heat welding, and the heat welding includes heating and pressing the welding protrusion section of the lower housing so as to bond the welding protrusion section to the upper housing, so that the upper housing and the lower housing are thereby integrated.

14. An electrical connector that can be engaged with a mating connector inserted from a tip side, the electrical connector comprising:

an insulating housing including a base section, a tongue-shaped section extending from the base section in an insertion/removal direction of the mating connector, a plurality of accommodation concave sections formed on the tongue-shaped section, and a plurality of protrusion sections installed on the tongue-shaped section so as to extend from tip surfaces of the plurality of accommodation concave sections toward a base end side; and a plurality of contacts held on the tongue-shaped section of the housing so as to be arranged on a contact plane and extend linearly along the insertion/removal direction of the mating connector, wherein tip sections of the plurality of contacts are respectively located within the plurality of accommodation concave sections formed on the tongue-shaped section of the housing, the plurality of protrusion sections of the housing are in contact with the tip sections of the plurality of contacts located within the plurality of accommodation concave sections, the plurality of contacts are not bonded to the tongue-shaped section of the housing, the contact plane includes a first contact plane and a second contact plane parallel to the first contact plane, the plurality of contacts include a plurality of first contacts arranged on the first contact plane and a plurality of second contacts arranged on the second contact plane, the housing includes an upper housing that holds the plurality of first contacts and a lower housing that holds the plurality of second contacts, the tongue-shaped section, the plurality of accommodation concave sections, and the plurality of protrusion sections of the housing are included in the lower housing, the upper housing is attached to the lower housing so that the plurality of first contacts held by the upper housing are located on an upper face of the tongue-shaped section of the lower housing, the plurality of second contacts are held on a lower face of the tongue-shaped section of the lower housing, and the lower housing has a welding protrusion section to be integrated with the upper housing, and the welding protrusion section of the lower housing is bonded to the upper housing, so that the upper housing and the lower housing are thereby integrated.

* * * * *